US010486270B2

United States Patent
Pfeifer et al.

(10) Patent No.: US 10,486,270 B2
(45) Date of Patent: Nov. 26, 2019

(54) SYSTEM FOR DETERMINING INDUCTANCE OF A POWER CABLE

(71) Applicant: ILLINOIS TOOL WORKS INC., Glenview, IL (US)

(72) Inventors: Kyle Andrew Pfeifer, Appleton, WI (US); Anthony Van Bergen Salsich, Appleton, WI (US); Gregg Donald Prochnow, Hortonville, WI (US); Jeremy Daniel Overesch, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 379 days.

(21) Appl. No.: 14/616,333

(22) Filed: Feb. 6, 2015

(65) Prior Publication Data

US 2015/0283652 A1    Oct. 8, 2015

Related U.S. Application Data

(60) Provisional application No. 61/976,284, filed on Apr. 7, 2014.

(51) Int. Cl.
*B23K 37/00* (2006.01)
*B23K 10/00* (2006.01)
(Continued)

(52) U.S. Cl.
CPC .............. *B23K 37/00* (2013.01); *B23K 9/095* (2013.01); *B23K 9/0953* (2013.01); *B23K 10/006* (2013.01); *H05B 6/06* (2013.01)

(58) Field of Classification Search
CPC ...... B23K 37/00; B23K 9/0953; B23K 9/095; B23K 10/006; H05B 6/06
(Continued)

(56) References Cited

U.S. PATENT DOCUMENTS 3,689,734 A    9/1972 Burley
3,689,737 A    9/1972 Eckles
(Continued)

FOREIGN PATENT DOCUMENTS

EP    0970775    1/2000
EP    1138429    10/2001
(Continued)

OTHER PUBLICATIONS

International Search Report for application No. PCT/US2010/036843 dated Nov. 18, 2010.
(Continued)

*Primary Examiner* — Dana Ross
*Assistant Examiner* — Kuangyue Chen
(74) *Attorney, Agent, or Firm* — McAndrews, Held & Malloy, Ltd.

(57) ABSTRACT

A welding system monitors the changes in the power output provided from a power supply to a device to determine the inductance of power cables between the power supply and the device. The device may determine the inductance of the power cables based at least in part on a delay in a threshold change in voltage to the device after a change in the current demand of the device, a delay in the initialization of the change in the current demand of the device after an initialization signal, a rate of change of the current drawn by the device, or a relative comparison of the voltage to the device and the current drawn by the device, or any combination thereof. If the inductance of the power cables is greater than a threshold inductance, the device may signal the user, disable operation of the device, or any combination thereof.

20 Claims, 17 Drawing Sheets

(51) Int. Cl.
  *H05B 6/06* (2006.01)
  *B23K 9/095* (2006.01)
(58) Field of Classification Search
  USPC ............ 219/660, 121.39, 130.2, 137.71, 148
  See application file for complete search history.

(56) References Cited

U.S. PATENT DOCUMENTS

| | | | |
|---|---|---|---|
| 4,045,973 A * | 9/1977 | Anderson | ............ F24F 11/0009 |
| | | | 318/778 |
| 4,359,622 A | 11/1982 | Dostoomian | |
| 4,384,188 A | 5/1983 | Wright | |
| 4,438,317 A | 3/1984 | Ueguri | |
| 4,521,671 A | 6/1985 | Fronius | |
| 4,544,826 A | 10/1985 | Nakanishi | |
| 4,749,935 A | 6/1988 | Osborne | |
| 4,794,232 A | 12/1988 | Kimbrough | |
| 4,866,247 A | 9/1989 | Parks | |
| 4,947,021 A | 8/1990 | Stava | |
| 5,059,766 A | 10/1991 | Gilliland | |
| 5,278,390 A | 1/1994 | Blankenship | |
| 5,357,078 A | 10/1994 | Smith | |
| 5,591,355 A | 1/1997 | Ishikawa | |
| 5,600,550 A | 2/1997 | Cook, II | |
| 5,864,116 A | 1/1999 | Baker | |
| 5,991,169 A | 11/1999 | Kooken | |
| 6,015,964 A | 1/2000 | Baker | |
| 6,111,216 A | 8/2000 | Stava | |
| 6,160,241 A | 12/2000 | Stava | |
| 6,172,888 B1 | 1/2001 | Jochi | |
| 6,225,598 B1 | 5/2001 | Nihei | |
| 6,321,139 B1 | 11/2001 | Terada | |
| 6,321,167 B1 | 11/2001 | Jochi | |
| 6,359,258 B1 * | 3/2002 | Blankenship | ............ B23K 9/10 |
| | | | 219/130.01 |
| 6,365,874 B1 | 4/2002 | Stava | |
| 6,596,970 B2 | 7/2003 | Blankenship | |
| 6,649,869 B2 | 11/2003 | Reynolds | |
| 6,710,297 B1 | 3/2004 | Artelsmair | |
| 6,717,108 B2 | 4/2004 | Hsu | |
| 6,930,279 B2 | 8/2005 | Myers | |
| 7,049,545 B2 | 5/2006 | Matus | |
| 7,064,290 B2 | 6/2006 | Blankenship | |
| 7,105,772 B2 | 9/2006 | Houston | |
| 7,173,214 B2 | 2/2007 | Nadzam | |
| 7,301,308 B2 | 11/2007 | Aker | |
| 8,049,140 B2 | 11/2011 | Kawamoto | |
| 8,199,536 B2 | 6/2012 | Mangraviti | |
| 8,225,598 B2 | 7/2012 | Haeberer | |
| 8,269,141 B2 | 9/2012 | Daniel | |
| 8,278,882 B2 | 10/2012 | Gotou | |
| 8,410,398 B2 | 4/2013 | Daniel | |
| 8,455,794 B2 | 6/2013 | Vogel | |
| 8,525,077 B2 | 9/2013 | Peters | |
| 8,546,729 B2 | 10/2013 | Derda | |
| 8,581,147 B2 | 11/2013 | Kooken | |
| 8,653,413 B2 | 2/2014 | Vogel | |
| 8,785,816 B2 | 7/2014 | Kooken | |
| 2002/0175798 A1 * | 11/2002 | Sigl | ............ H01F 38/085 |
| | | | 336/198 |
| 2006/0054610 A1 | 3/2006 | Morimoto | |
| 2006/0138113 A1 * | 6/2006 | Ott | ............ B23K 9/1087 |
| | | | 219/132 |
| 2006/0175313 A1 | 8/2006 | Kooken | |
| 2006/0226130 A1 | 10/2006 | Kooken | |
| 2006/0243716 A1 | 11/2006 | Stava | |
| 2007/0181547 A1 | 8/2007 | Vogel | |
| 2008/0078812 A1 | 4/2008 | Peters | |
| 2008/0149607 A1 * | 6/2008 | Albrecht | ............ B23K 9/1006 |
| | | | 219/130.1 |
| 2008/0296276 A1 * | 12/2008 | Schartner | ............ B23K 9/1031 |
| | | | 219/130.31 |
| 2009/0119036 A1 * | 5/2009 | Jayanth | ............ F04B 49/065 |
| | | | 702/60 |
| 2010/0308026 A1 * | 12/2010 | Vogel | ............ H02M 3/157 |
| | | | 219/130.21 |
| 2010/0308027 A1 | 12/2010 | Vogel | |
| 2011/0108536 A1 | 5/2011 | Inada | |
| 2012/0000895 A1 | 1/2012 | Sato | |
| 2013/0092672 A1 | 4/2013 | Peters | |
| 2013/0327753 A1 | 12/2013 | Roth | |
| 2013/0334201 A1 * | 12/2013 | Nicholson | ............ H05B 1/025 |
| | | | 219/492 |
| 2014/0374397 A1 | 12/2014 | Vogel | |
| 2017/0047184 A1 * | 2/2017 | Ashtekar | ............ H01H 71/04 |

FOREIGN PATENT DOCUMENTS

| | | |
|---|---|---|
| FR | 2850463 | 7/2004 |
| GB | 2393338 | 3/2004 |
| JP | S61273260 | 12/1986 |
| JP | 2001276971 | 10/2001 |
| WO | 2008140398 | 1/2008 |

OTHER PUBLICATIONS

International Search Report for PCT application No. PCT/US2015/01607, dated Jul. 24, 2015, 12 pgs.

* cited by examiner

SYSTEM FOR DETERMINING INDUCTANCE OF A POWER CABLE

CROSS-REFERENCE TO RELATED APPLICATIONS

This application claims priority from and the benefit of U.S. Provisional Application Ser. No. 61/976,284, entitled "SYSTEM AND METHOD FOR DETERMINING INDUCTANCE OF POWER CABLE," filed Apr. 7, 2014, which is hereby incorporated by reference in its entirety for all purposes.

BACKGROUND

The invention relates generally to welding systems, and, more particularly, to determining an inductance of one or more power cables, such as power cables between a power supply and a welding device.

Welding systems support a variety of processes, such as metal inert gas (MIG) welding, tungsten inert gas (TIG) welding, stick welding, and so forth, which may operate in different modes, such as constant current or constant voltage. Certain welding applications, such as boiler servicing and repair, shipyard work, construction, and so forth, may position a welding location or workpiece large distances from a welding power source.

Power cables supply output power to a welding application from the welding power source. Advanced forms of MIG welding are based upon generation of pulsed power to deposit welding wire on the workpiece. However, power cables can be arranged between a welding power source and a welding application such that an inductance of the power cables may affect the timing or amplitude of the welding application.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a welding system monitors the changes in the power output provided from a power supply to a device to determine the inductance of power cables between the power supply and the device. The device may determine the inductance of the power cables based at least in part on a delay in a threshold change in voltage to the device after a change in the current demand of the device, a delay in the initialization of the change in the current demand of the device after an initialization signal, a rate of change of the current drawn by the device, or a relative comparison of the voltage to the device and the current drawn by the device, or any combination thereof. If the inductance of the power cables is greater than a threshold inductance, the device may signal the user. The device may disable operation with the power supply while the inductance of the power cables is greater than the threshold inductance. The user may adjust the arrangement of the power cables and/or replace the power cables to affect the inductance of the power cables. When the inductance of the power cables is less than the threshold inductance, the device may enable operation with the power supply. During idle operation of the welding system, the device may determine the inductance of the power cables at various times. For example, the device may determine the inductance of the power cables at start up of the welding system, periodically during operation of the welding system, and/or at random intervals during operation of the welding system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 16:
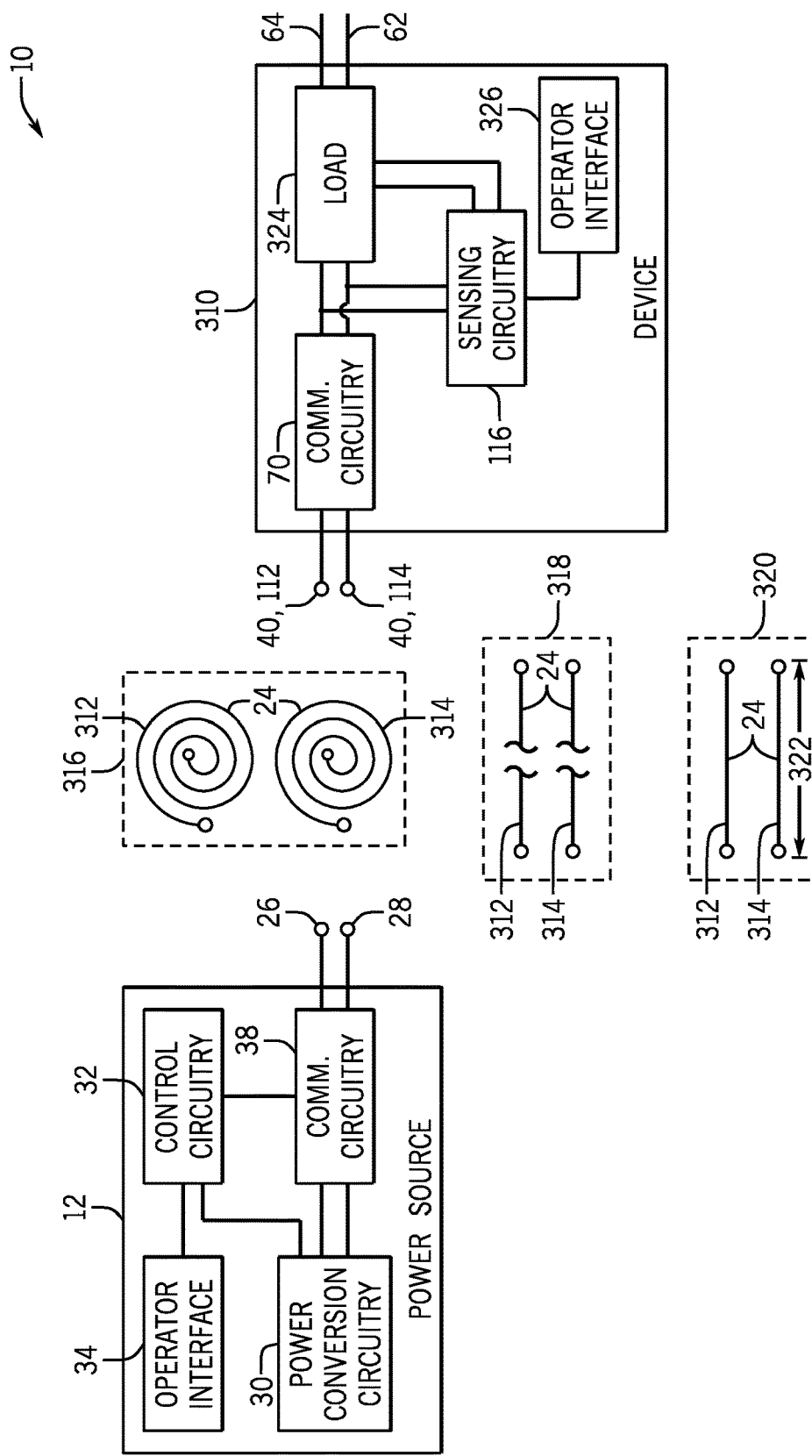
FIG. 16 is an embodiment of a welding system with power cables to couple a device to a power supply.
Figure 17:
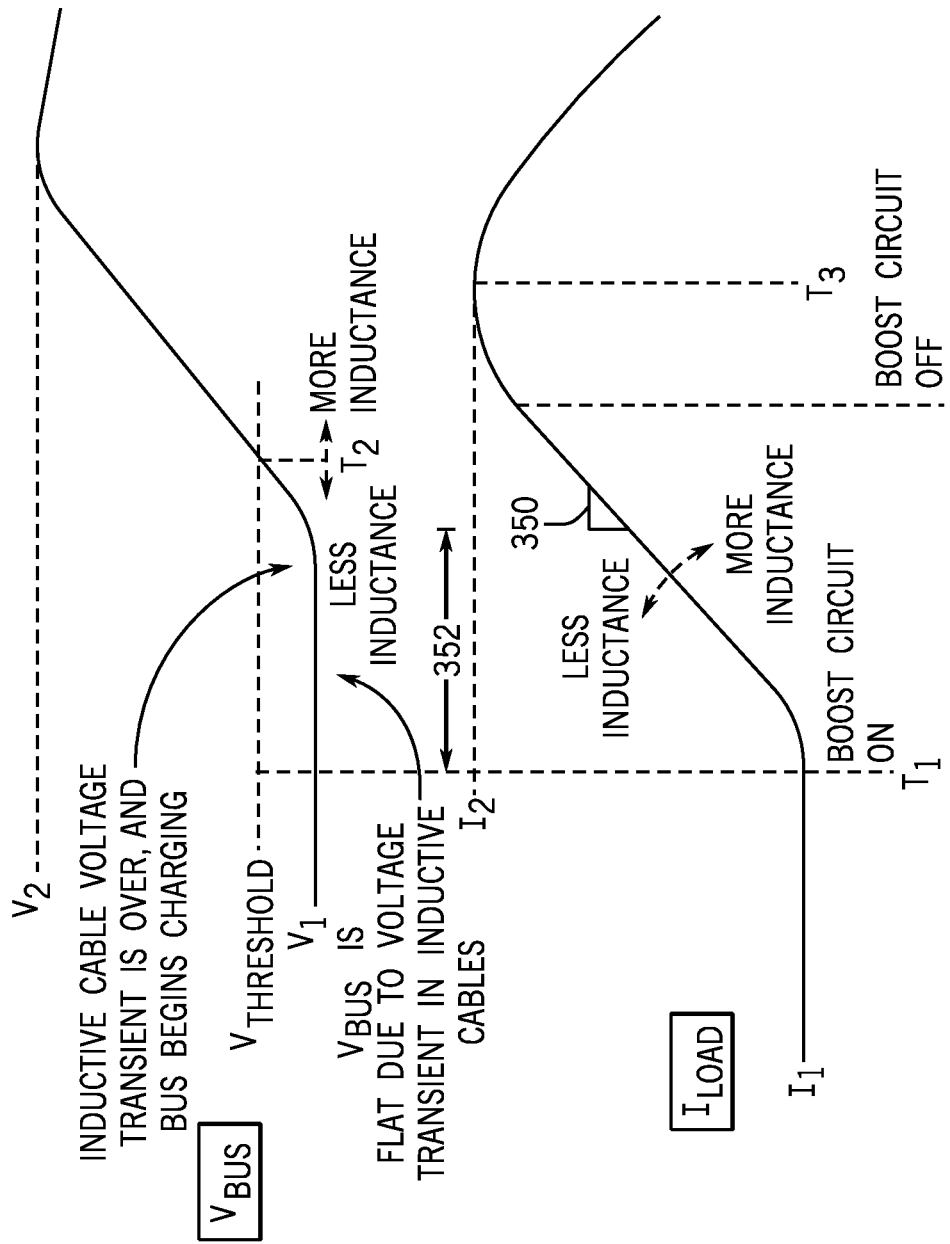
FIG. 17 is a chart of input voltage and input current versus time, where the input voltage and input current are provided over power cables to a device.
Figure 18:
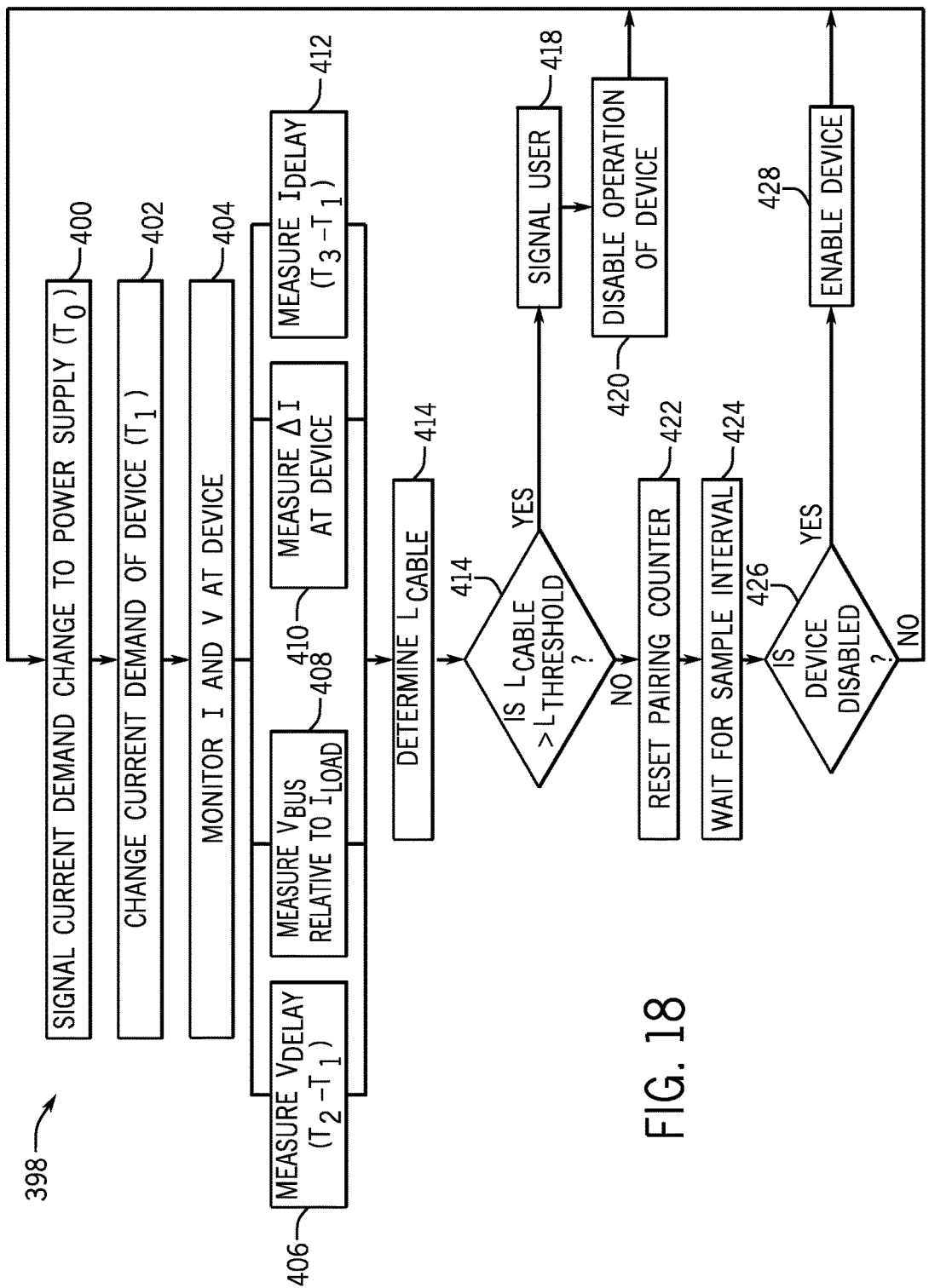
FIG. 18 is a flow chart of an embodiment of a method for determining an inductance of power cables between a power supply and a device of the welding system.

Welding systems include a power supply that provides a power output to one or more devices along power cables. The devices coupled to the power supply may include, but are not limited to a wire feeder, an advanced process wire feeder, an induction heater, a plasma cutter, a power generator, or any combination thereof. The inductance of the power cables may delay the current input to the device, thereby affecting the time that the power output provided from the power supply is available to the device. As discussed in detail below, the device (e.g., advanced process wire feeder) may reduce or eliminate the effect that the inductance of the power cables has on the output of the device. For example, the device may utilize power storage circuitry (e.g., bus capacitor, battery) to enable the device to provide a desired output for a period of time when the output power from the device is different than the input power received from the power supply. FIGS. 1-15 below describe embodiments of a welding system 10 with an advanced process wire feeder 20 coupled to a power supply 12 via power cables 24. The advanced process wire feeder 20 may reduce or eliminate the effect that an inductance of the power cables 24 may have on the welding output of a torch 14 coupled to the welding system 10. FIGS. 16-18 below describe embodiments of a welding system 10 with a device 310 that may determine the inductance of the power cables 24. The device 310 may compare the inductance of the power cables 24 to a threshold inductance, and may provide a signal to a user when the determined inductance is greater than the threshold inductance. The control circuitry of the device 310 may disable operation of the device 310 while the determined inductance of the power cables 24 is greater than the threshold inductance, thereby protecting circuitry components of the device 310 and/or maintaining a desired quality of output from the device 310. As may be appreciated, the device 310 may include, but is not limited to, the advanced process wire feeder 20.

Although described herein as determining inductance of the power cables 24 and implementing a change in the operation of the device 310 based on the determined inductance, in other embodiments, some other parameter indicative of a delay in the welding system 10 may be determined and a change in the operation of the device 310 may be implemented based on this other parameter. In other words, while the parameter indicative of the delay that is determined by the control circuitry of the device 310 may, in some embodiments, be analogous to the inductance in the power cables 24, this parameter may only bear some relation to inductance in the power cables 24 in other embodiments. For example, in certain embodiments, there may be a direct (e.g., 1:1 relationship) between the determined parameter indicative of the delay and the inductance of the power cables 24 in some embodiments, whereas in other embodiments the inductance of the power cables 24 may only be one factor that affects the parameter indicative of the delay. In general, however, the parameter indicative of delay in the welding system 10 may be at least partially affected by the inductance in the power cables 24 or, at least, in an inductance of the welding system 10 in general.

Figure 1:
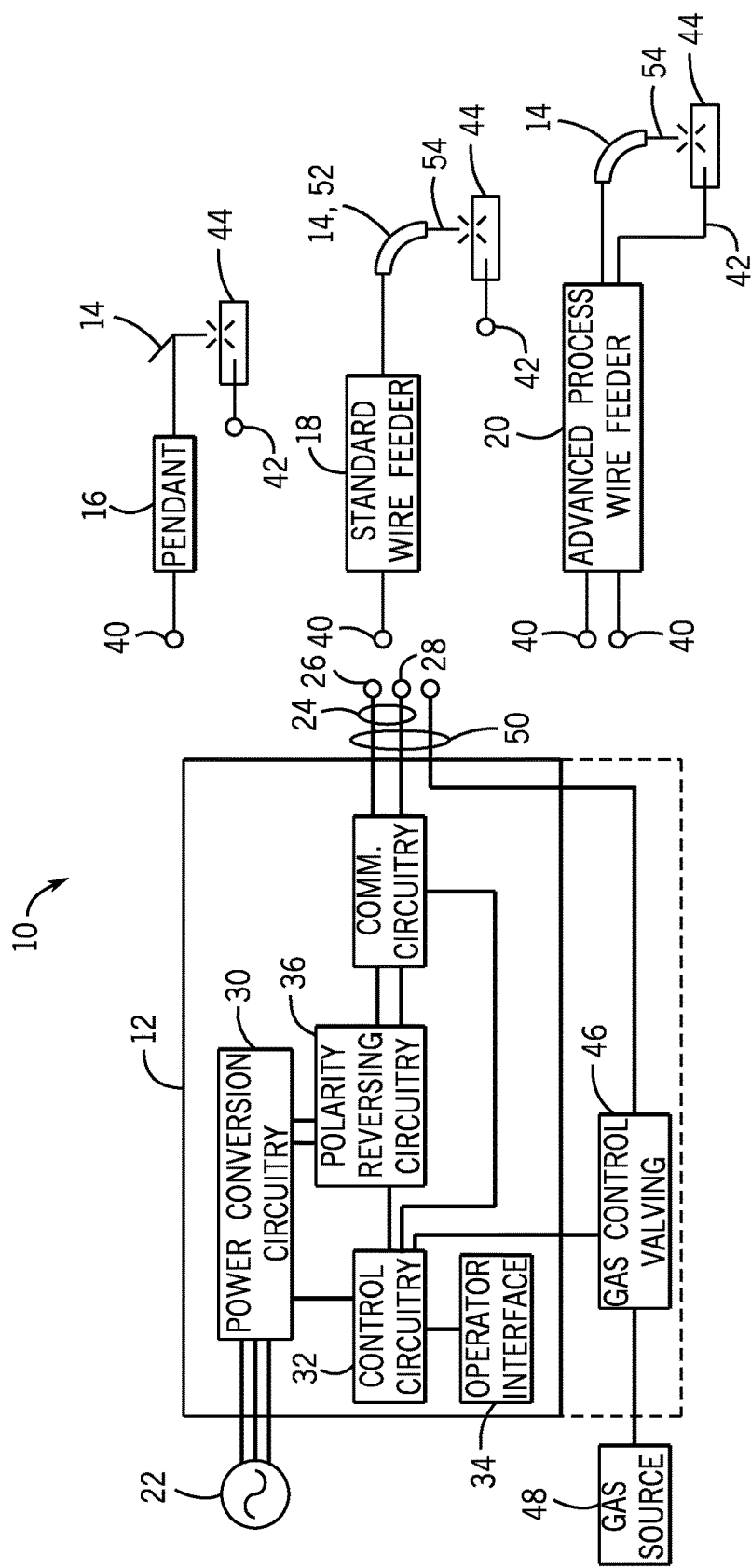
FIG. 1 is a block diagram of a welding system having a welding power source and an advanced process wire feeder in accordance with aspects of the present disclosure.

FIG. 1 is a block diagram of an embodiment of a welding system 10 which powers a welding application. As illustrated, the welding system 10 includes a welding power source 12 and a coupled welding torch 14. The welding power source 12 supplies input power to the welding torch 14. The welding torch 14 may be a torch configured for stick welding, tungsten inert gas (TIG) welding, or gas metal arc welding (GMAW), based on the desired welding application. In some embodiments, the welding power source 12 supplies input power to a pendant 16 coupled to a torch 14 configured for stick welding or TIG welding. The operator supplies the filler metal, if any, for stick or TIG welding. The pendant 16 may be configured to control the power source 12 and/or notify the operator of welding parameters. In other embodiments, the welding power source 12 supplies input power to a standard wire feeder 18. The standard wire feeder 18 supplies the input power and filler metal to a welding torch 14 configured for GMAW welding or flux core arc welding (FCAW). In some embodiments, the welding power source 12 supplies input power to an advanced process wire feeder 20. The advanced process wire feeder 20 is configured to convert the input power of the welding power source 12 to welding output. In some embodiments, the welding output of the advanced process wire feeder 20 may be a controlled waveform welding output. Controlled waveform welding outputs include welding outputs adapted to a pulsed welding process or a short circuit welding process.

The welding power source 12 is coupled to an alternating current (AC) source 22, such as an electrical grid or engine-driven generator that supplies primary power. The welding power source 12 may process the primary power to input power supplied to the welding torch 14 via power cables 24. In some embodiments, the power cables 24 includes a first terminal 26 and a second terminal 28, wherein one terminal has a positive polarity and the other has a negative polarity. Power conversion circuitry 30 converts the AC current to input power as either direct current (DC) or AC. The power conversion circuitry 30 may include circuit elements such as transformers, switches, boost converters, inverters, and so forth, capable of converting power as dictated by the demands of the welding system 12. In some embodiments, the power conversion circuitry 30 is configured to convert the primary power to an approximately 80V DC input power to supply the pendant 16, standard wire feeder 18, or advanced process wire feeder 20. The input power may be between approximately 50 to 120V DC.

The welding power source 12 includes control circuitry 32 and an operator interface 34. The control circuitry 32 controls the operations of the welding power source 12 and may receive input from the operator interface 34 through which an operator may choose a welding process (e.g., stick, TIG, MIG) and input desired parameters of the input power (e.g., voltages, currents, particular pulsed or non-pulsed welding regimes, and so forth). The control circuitry 32 may be configured to receive and process a plurality of inputs regarding the performance and demands of the system 12. The control circuitry 32 may include volatile or non-volatile memory, such as ROM, RAM, magnetic storage memory, optical storage memory, or a combination thereof. In addition, a variety of control parameters may be stored in the memory along with code configured to provide a specific output (e.g., reverse polarity, pre-charge capacitor, enable gas flow, etc.) during operation.

The welding power source 12 may include polarity reversing circuitry 36 and communications circuitry 38 coupled to the control circuitry 32. The polarity reversing circuitry 36 reverses the polarity of the first and second terminals 26, 28 when directed by the control circuitry 32. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry 36 may be configured to reverse the polarity from DCEN to DCEP. The operator may reverse the polarity manually, or the control circuitry 32 may direct the polarity reversing circuitry 36 to reverse the polarity in response to signals received through the communications circuitry 38. The communications circuitry 38 is configured to communicate with the welding torch 14, pendant 16, standard wire feeder 18, advanced wire feeder 20, and/or other device coupled to the power cables 24. In some embodiments, the communications circuitry 38 is configured to send and receive command and/or feedback signals over the welding power cables 24 used to supply the input power. In other embodiments, the communications circuitry 38 is configured to communicate wirelessly with another device.

Devices including the pendant 16, standard wire feeder 18, and advanced process wire feeder 20 receive input power through the input terminal 40 configured to couple with the first and second terminals 26, 28 of the power cables 24. In some embodiments, the first terminal 26 is configured to connect with the input terminal 40 and the second terminal 28 is configured to connect with the clamp 42 coupled to the workpiece 44. In some embodiments, the input terminal 40 has input connections with defined polarities configured to couple to the respective first and second terminals 26, 28 of the same polarities, and the clamp 42 couples to the pendant 16 or wire feeder 18. The advanced process wire feeder 20 is configured to couple to the first and second terminals 26, 28 with input terminals 40, and the clamp 42 is coupled to the advanced process wire feeder 20.

For some welding processes (e.g., TIG, GMAW), a shielding gas is utilized during welding. In some embodiments, as shown in the dashed lines, the welding power source 12 includes one or more gas control valves 46 configured to control a gas flow from a gas source 48. The gas control valves 46 may be controlled by the control circuitry 32. The welding power source 12 may be coupled to one or more gas sources 48 because some welding processes may utilize different shielding gases than others. In some embodiments, the welding power source 12 is configured to supply the gas with the input power via a combined input cable 50. In other embodiments, the gas control valves 46 and gas source 48 may be separate from the welding power source 12. For example, the gas control valves 46 may be disposed within the standard or advanced wire feeder 18, 20. The standard and advanced wire feeders 18, 20 shown in FIG. 1 are coupled to GMAW torches 52 configured to supply the gas and welding wire 54 to the welding application.

Figure 2:
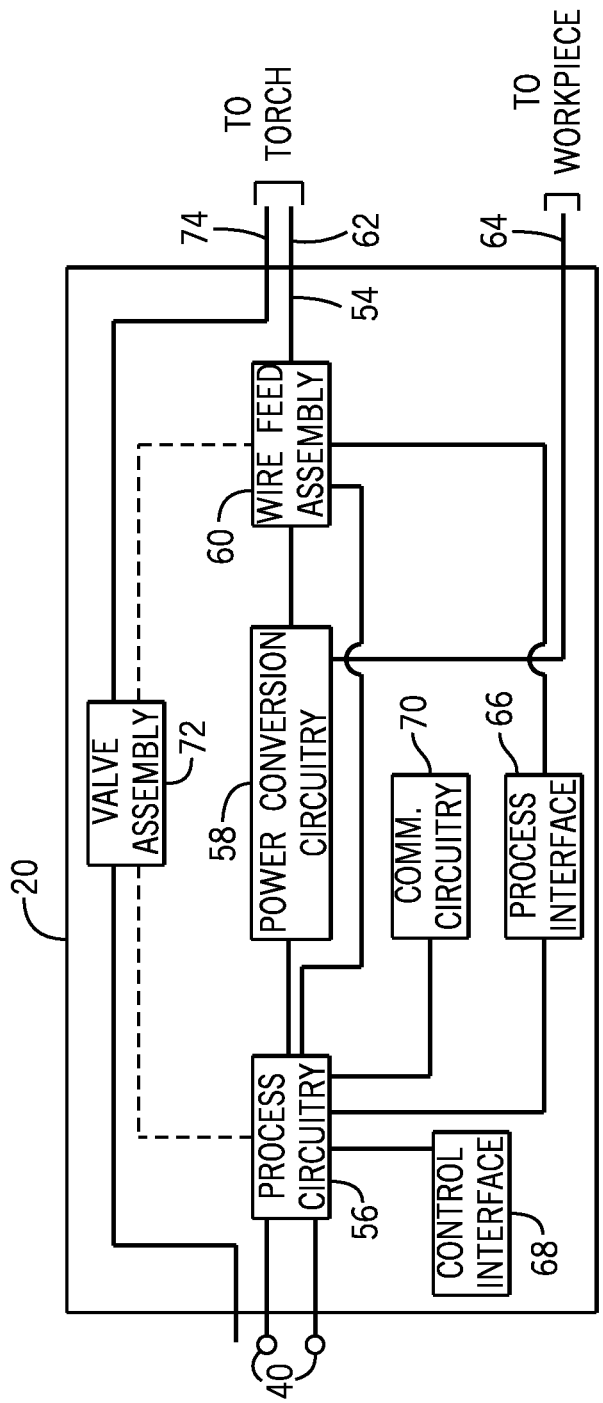
FIG. 2 is a block diagram of an embodiment of the advanced process wire feeder of FIG. 1.

FIG. 2 illustrates a block diagram an embodiment of the advanced process wire feeder 20 for converting input power to controlled waveform welding output. The advanced process wire feeder 20 receives the input power from the welding power source through input terminals 40 coupled to process circuitry 56. In some embodiments, the advanced process wire feeder 20 is operated remotely from the welding power source with long power cables. Process circuitry 56 may include circuitry such as relay circuitry, voltage and current sensing circuitry, power storage circuitry, and so forth, capable of sensing and controlling the input power received by the advanced process wire feeder 20. The process circuitry 56 transmits the input power to the power conversion circuitry 58.

Power conversion circuitry 58 is configured to convert the input power from the welding power source to welding output suitable for performing welding applications. Power conversion circuitry 58 may include circuit elements such as boost converters, buck converters, an internal bus, bus capacitor, voltage and current sensors, and so forth, capable of converting the input power to welding output. In some embodiments, input power received by the advanced process wire feeder 20 is a DC voltage between approximately 20V to 120V, approximately 40V to 100V, or approximately 60V to 80V. As used in reference to the input power, the term approximately may mean within 5 volts or within 10 percent of the desired voltage. The power conversion circuitry 58 may be configured to convert the input power to a controlled waveform welding output, such as a pulsed welding process or a short circuit welding process (e.g., regulated metal deposition (RMD™)). The power conversion circuitry 58 disposed within the advanced process wire feeder 20 supplies the controlled waveform welding output for the welding application without attenuation from the power cable between the welding power source and the advanced process wire feeder 20. This increases the response time and accuracy of the controlled waveform welding output supplied to the welding torch. Increasing the response time of the controlled waveform welding output may ensure that the desired welding output waveform is supplied to welding torch at specific times during the weld. For example, the RMD™ welding process utilizes a controlled waveform welding output having a current waveform that varies at specific points in time over a short circuit cycle. Increasing the response time of the controlled waveform welding output may also improve the timing of the waveform pulses to produce a desired weld.

In some embodiments, the power conversion circuitry 58 is configured to provide the welding output to the wire feed assembly 60. The wire feed assembly 60 supplies welding wire 54 to the welding torch for the welding operation. The wire feed assembly 60 includes elements such as a spool, wire feed drive, drive rolls, and wire feed control circuitry. The wire feed assembly 60 feeds welding wire 54 to the welding torch along a weld cable 62. The welding output may be supplied through the weld cable 62 coupled to the welding torch and/or the work cable 64 coupled to the workpiece.

Presently contemplated embodiments of the advanced process wire feeder 20 have a process operator interface 66 and a control operator interface 68 for control of parameters of the welding system. The process operator interface 66 is coupled to the process circuitry 56 for operator selection and adjustment of the welding process (e.g., pulsed, short-circuit, FCAW) through selection of the wire size, wire type, material, and gas parameters. The process operator interface 66 is coupled to the wire feed assembly 60 for control of supplying the welding wire 54 to the welding torch. The control operator interface 68 is coupled to the process circuitry 56 to adjust the voltage, amperage, wire feed speed, and arc length for a welding application. In some embodiments, the process operator interface 66 and the control operator interface 68 are separate interfaces, each with respective control circuitry. Alternatively, the process operator interface 66 and the control operator interface 68 may have common control circuitry and/or form a common control and process operator interface. The process operator interface 66 and/or the control operator interface 68 may include volatile or non-volatile memory, such as ROM, RAM, magnetic storage memory, optical storage memory, or a combination thereof. In addition, a variety of parameters may be stored in the memory along with code configured to provide a specific output for default parameters during operation.

The process interface 66 is configured to receive input such as wire material (e.g., steel, aluminum), wire type (e.g., solid, cored), wire diameter, gas type, and so forth. Upon receiving the input, the process circuitry 56 is configured to determine the controlled waveform welding output for the welding application. For example, the process circuitry 56 determines the pulse width, relative pulse amplitude, and/or wave shape for a controlled waveform welding output process based at least in part on the input received through the process interface 66. The wire feed assembly 60 may be configured to supply the welding wire 54 based on code or instructions stored in memory based on the received input. The wire feed assembly 60 is coupled to a process operator interface 66 and control operator interface 68 for controlling the welding wire 54 supplied for a welding operation. The wire feed assembly 60 adjusts parameters for supplying the welding wire 54 to the welding torch based at least in part on operator input received via the process operator interface 66 or the operator interface 68. The control operator interface 68 is configured to receive operator input for parameters such as the amperage, voltage, polarity, wire feed rate, arc length, process type (e.g., RMD™, pulsed welding), and so forth. In some embodiments, the control operator interface is configured to adjust the power of the controlled waveform welding output without affecting the shape of the controlled waveform welding output. The process circuitry 56 adjusts the power conversion circuitry 58 and wire feed assembly 60 based at least in part on operator input received via the control operator interface 68. In some embodiments, communications circuitry 70 coupled to the process circuitry 56 is configured to send and receive command and/or feedback signals over the power cable used to provide the input power. The communications circuitry 70 enables the process operator interface 66 and/or control operator 68 to control the welding power source. For example, the process operator interface 66 and/or control operator 68 may be configured to control the amperage, voltage, or other parameters of the input power supplied by the welding power source. In some embodiments, the process circuitry 56 controls the welding power source remote from the welding power source without being restricted to parameters set on the operator interface 34 (FIG. 1). That is, the process circuitry 56 and communications circuitry 70 enables an operator to control the welding power source remotely through the advanced process wire feeder 20 with equal control priority to the operator interface 34 of the welding power source.

Some embodiments of the advanced process wire feeder 20 include a valve assembly 72 for providing gas to the welding torch along a gas line 74. The valve assembly 72 may be controlled by the process circuitry 56 and/or the wire feed assembly 60 as shown by the dashed control lines. For example, the valve assembly 72 may be configured to supply gas to the welding torch prior to and after a welding application. In some embodiments, the valve assembly 72 is configured to purge the gas line 74 upon receiving a purge command from the process operator interface 66 or the control operator interface 68.

Figure 3:
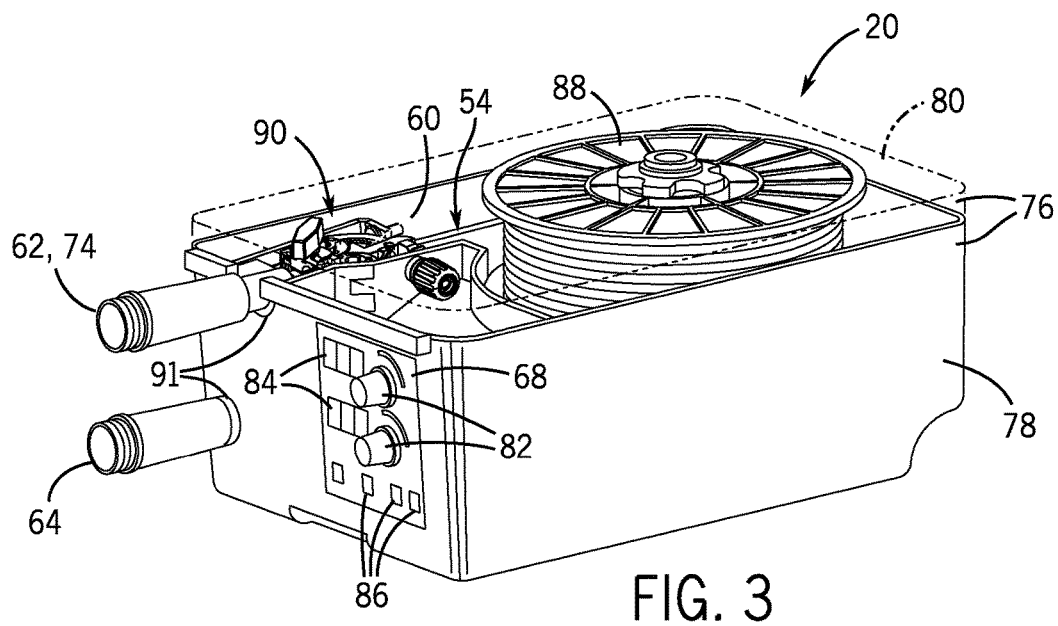
FIG. 3 is a front perspective view of an advanced process wire feeder in accordance with aspects of the present disclosure.

FIG. 3 illustrates a front perspective view of an embodiment of the advanced process wire feeder 20 disposed in an enclosure 76 having the process operator interface 66 separate from the control operator interface 68. In some embodiments, the advanced process wire feeder 20 is disposed in an enclosure 76 having an enclosure base 78 and enclosure cover 80 to shield the wire feed assembly 60 from the operating environment when the enclosure 76 is closed. The enclosure 76 may be substantially portable (e.g., suitcase feeder) and configured for manual operator transport to a welding application remote from the welding power source. The enclosure cover 80 is shown in dashed lines for clarity to illustrate an embodiment of the wire feed assembly 60 disposed within the enclosure.

The control operator interface 68 may be disposed outside the enclosure 76 as illustrated in FIG. 3. The control operator interface 68 may include one or more dials 82, one or more displays 84, and one or more buttons 86. In some embodiments, the dials 82 may be configured to adjust voltage and/or amperage of the input power or welding output, wire speed, or arc length, or combinations thereof. One or more buttons 86 may enable the operator to select process types, operator preferences, or process parameters previously stored in memory, or combinations thereof. The control operator interface 68 may enable operator selection of process parameters stored in memory, such as previously selected amperage and wire speed for the selected controlled waveform welding process. The displays 84 may be configured to display adjusted process parameters and/or selected process type (e.g., RMD™, pulsed welding, FCAW, MIG). In some embodiments, the one or more displays 84, lights, or other devices may be configured to provide an operator-perceptible notification to notify the operator if the polarities of the coupled power cables correspond to the respective input terminals 40.

Embodiments of the advanced process wire feeder 20 include one or more spools 88 of welding wire 54 disposed within the enclosure 76 to supply the wire feed drive 90. The welding wire 54 is pulled through the wire feed drive 90 and an output terminal 91 to the weld cable 62. In some embodiments, the gas line 74 may be within the weld cable 62 as illustrated. A work cable 64 is coupled to the output terminal 91.

Figure 4:
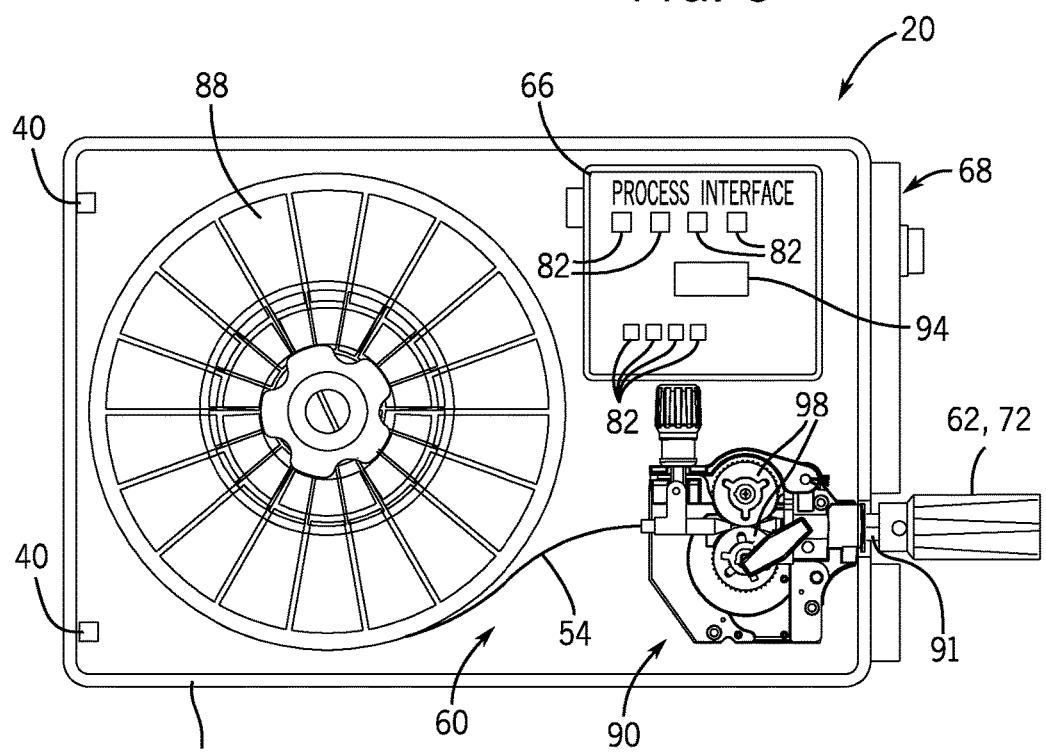
FIG. 4 is a top view of an embodiment of the advanced process wire feeder of FIG. 3.

FIG. 4 illustrates a top view of an embodiment of the advanced process wire feeder 20 with the process operator interface 66 disposed within the enclosure 76. The process operator interface 66 may include one or more buttons 92 and one or more indicators 94 to receive and display wire and material parameters. In some embodiments, the process operator interface 66 may be configured to receive gas parameters. The one or more buttons 92 of the process operator interface 66 may be configured to receive input such as wire material (e.g., steel, aluminum), wire type (e.g., solid, cored), wire diameter, and gas type. In some embodiments, the wire and/or gas parameters may be adjusted less frequently than the control parameters selected through the control operator interface 68. For example, process operator interface 66 may be disposed within the enclosure that is normally closed during welding. As another example, the process operator interface 66 may be adjusted primarily when changing the spool 88 of welding wire 54. Indicators 94 may include displays, lights, or other devices configured to provide an operator-perceptible notification indicating the selected wire and/or gas parameters. Two or more drive wheels 98 of the wire feed drive 90 are configured to direct the welding wire 54 through the output terminal 91 along the weld cable 62.

Figure 5:
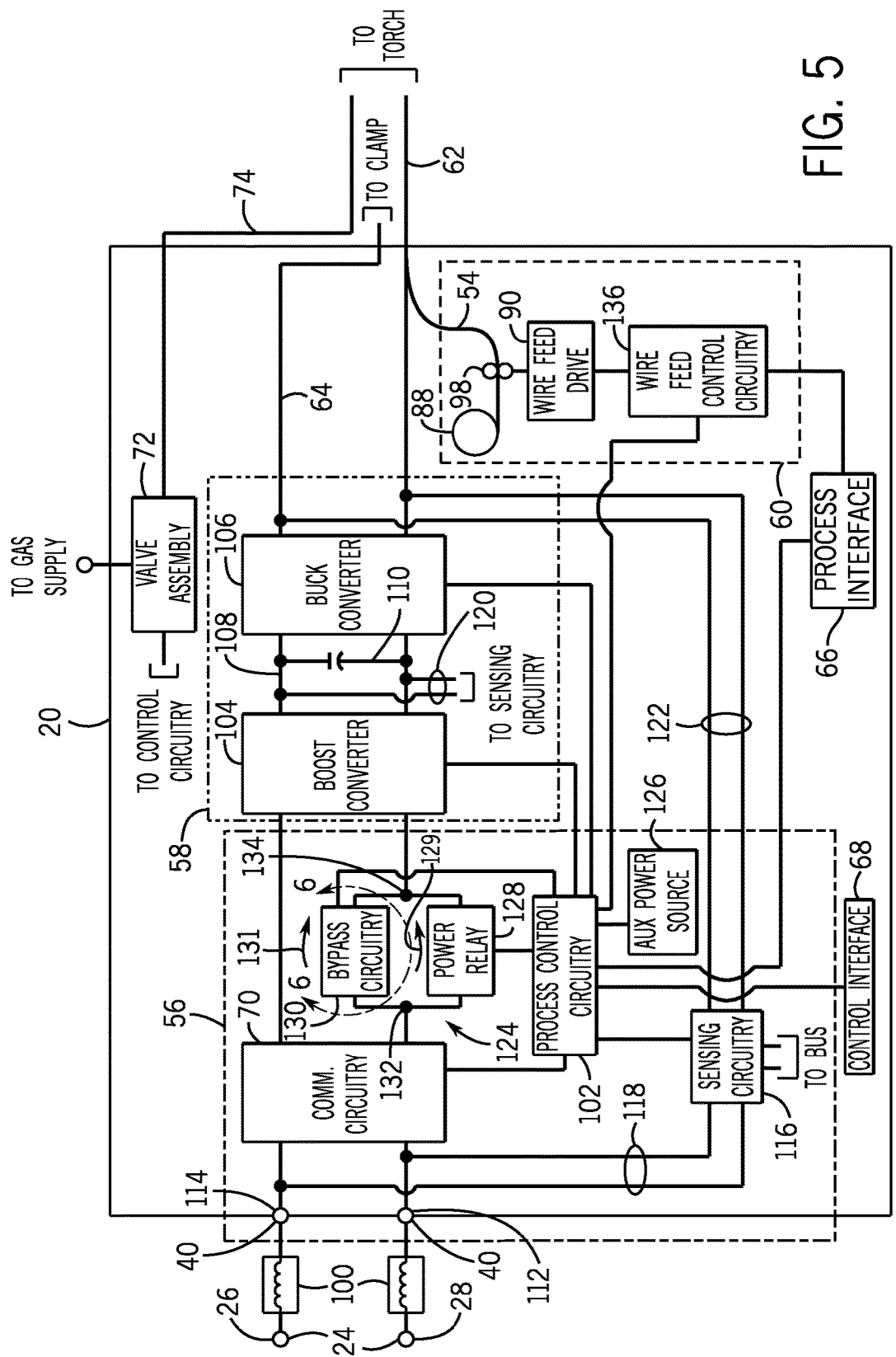
FIG. 5 is a block diagram of an embodiment of the advanced process wire feeder employing power conversion circuitry, relay circuitry, sensing circuitry, and a wire feed assembly in accordance with aspects of the present disclosure.

FIG. 5 illustrates a block diagram of an embodiment of the advanced process wire feeder 20 having process circuitry 56, power conversion circuitry 58, and a wire feed assembly 60. Embodiments of the advanced process wire feeder 20 may be coupled to long power cables 24 having an inductance 100. As may be appreciated, the power cables 24 may be conventional power cables 24. As discussed above, the advanced process wire feeder 20 may be located remotely from the welding power source. For example, the advanced process wire feeder 20 may be disposed between approximately 30 to 200 feet, approximately 50 to 150 feet, or approximately 100 to 150 feet from the welding power source 12. In some embodiments, the remotely located advanced process wire feeder may be in a different building, structure, or room than the welding power source 12. The inductance 100 may vary during use as the power cables 24 are coiled, extended, and moved.

The power conversion circuitry 58 is configured to receive the input power from the power cables 24 and convert the input power to welding output. The power conversion circuitry may convert the input power to welding output without regard to the inductance 100 of the power cables 24. Process control circuitry 102 controls the power conversion circuitry 58 based at least in part on parameters received from the process operator interface 66 and/or control operator interface 68. The process control circuitry 102 controls a boost converter 104 and a buck converter 106 to convert the input power to welding output. An internal bus 108 may be disposed between the boost converter 104 and buck converter 106. Only one boost converter 104 and buck converter 106 are discussed herein for clarity, however, other embodiments of the power conversion circuitry 58 may have one or more boost converters 104 and/or one or more buck converters 106. The boost converter 104 and buck converter 106 are configured to convert the input power to welding output suitable for controlled waveform welding processes, such as for RMD™ and pulse welding processes.

The boost converter 104 receives DC voltage from the input terminals 40 and steps-up, or increases, the DC voltage of the bus power supplied to the buck converter 106. As may be appreciated, the boost converter 104 converts the DC input power from the welding power source to a substantially pulsed stepped-up voltage DC bus power using a switch (e.g., FET) to open and close a boost circuit. The stepped-up voltage of the DC bus power is based at least upon the duty cycle of the switch. Varying the duty cycle of the switch affects the timing of when the stepped-up voltage DC bus power is supplied to the internal bus 108. By controlling the switch of the boost converter 104, the process control circuitry 102 may adjust the timing, voltage, and amperage of the DC bus power.

The buck converter 106 receives the stepped-up voltage DC bus power and steps-down, or decreases, the DC voltage to control the amperage of the welding output. As may be appreciated, the buck converter 106 converts the pulsed, stepped-up voltage DC bus power to a pulsed, stepped-down voltage DC welding output using a switch (e.g., FET) to open and close a buck circuit. As with the boost converter 104, varying the duty cycle of the switch of the buck converter 106 affects the timing of when the stepped-down voltage DC welding output is supplied to the welding torch. In some embodiments, multiple buck converters 106 may be coupled to the internal bus 108 in parallel and controlled separately to affect the timing and amplitude of changes (e.g., pulses) to the welding output. By controlling the switch of the buck converter 106, the process control circuitry 102 may adjust the timing, voltage, and amperage of the DC welding output. The control circuitry 102 is configured to control the switches of the boost and buck converters 104, 106 to dynamically adjust the voltage and/or amperage of the DC welding output supplied to the torch based on the operator selected welding process (e.g., RMD™, pulsed welding, FCAW, MIG). In some embodiments, the process control circuitry 102 is configured to control the boost converter 104 and/or buck converter 106 based on sensed parameters of the input power, bus power, or welding output, or combinations thereof. For example, the control circuitry 102 may control the boost converter 104 based on sensed parameters of the welding output to control the voltage across the internal bus 108.

In some embodiments, a power storage circuit (e.g., bus capacitor 110) may be disposed on the internal bus 108. The bus capacitor 110 may partially protect the boost converter 104 and/or buck converter 106 from a difference between the input power into the power conversion circuitry 58 and the welding output from the power conversion circuitry 58 at any time. As discussed above, the bus power converted by the boost converter 104 is directed to the internal bus 108, then the buck converter 106. The bus capacitor 110 may be configured to store the bus power until it is received by the buck converter 106. Storing and discharging relatively large amounts of power in the bus capacitor 110 may heat the bus capacitor. The voltage difference between the bus power supplied by the boost converter 104 and the bus power removed by the buck converter 106 to convert to welding output may be measured as voltage ripple. Decreasing the magnitude of the voltage ripple may improve the weld quality and/or maintain the temperature of the bus capacitor 110. The size and capacitance of the bus capacitor 110 may be based on the magnitude of the voltage ripple, which is affected at least in part on control of the boost converter 104 and the buck converter 106. The bus capacitor 110 may partially attenuate and/or delay the voltage ripple.

In some embodiments, the process control circuitry 102 is configured to control the duty cycles of the boost converter 104 and the buck converter 106 to reduce the voltage ripple of the bus capacitor 110 based at least in part on sensed parameters of the input power and welding output. The current and voltage of the input power are sensed at the first and second connections 112, 114 by sensing circuitry 116 through input sensors 118. The sensing circuitry 116 senses the current and voltage at the internal bus 108 across the bus capacitor 110 through bus sensors 120, and senses the current and voltage of the welding output through output sensors 122. The process control circuitry 102 may drive the boost converter 104 and the buck converter 106 based at least in part on sensed parameters (e.g., voltage, current) of the welding output, the input power, or the bus power, or combinations thereof. For example, the sensing circuitry 116 may sense the voltage and current of the welding output with welding output sensors 122 and sense the voltage of the input power and bus power with input sensors 118 and bus sensors 120. In some embodiments, the process control circuitry 102 is configured to determine the product (i.e., power) of the welding output current and voltage and loss of the power conversion circuitry 58, to determine the sum of the loss and the product, to divide the sum by the input voltage to determine the desired bus current, and to drive the boost converter 104 to control the bus current. The boost converter 104 may control the bus current to the desired bus current to substantially match the bus power into the internal bus 108 with the welding output removed from the internal bus 108. The inductance 100 of the power cables 24 delays the current flow into the internal bus 108 from the welding power source. Controlling the boost converter 104 based on the input sensors 118 and/or bus sensors 120 rather than the current and voltage of the input power at the welding power source reduces the voltage ripple on the bus capacitor 110. Controlling the boost converter 104 based on the input sensors 118 and/or bus sensors 120 reduces or eliminates the effects of the inductance 100 on the welding output. In some embodiments, the process control circuitry 102 is configured to control the boost and buck converters 104, 106 to reduce the voltage ripple on the internal 108 bus at least while the buck converter 106 is converting the bus power to a welding output suitable for a controlled waveform welding process (e.g., pulsed welding, short circuit welding).

The process control circuitry 102 may be configured to reduce the voltage ripple by adjusting the timing of the control signals for the duty cycle of switches within the boost and buck converters 104, 106. By adjusting the timing of the control signals, the process control circuitry 102 may be configured to generally align pulses (e.g., phases) of the welding output voltage and current with the pulses of the input current of the input power. The process control circuitry 102 may adjust the relative timing (e.g., phase shift, advance in time, delay in time) signal pulses from the boost converter 104 and/or buck converter 106 to reduce the voltage ripple. Reducing the voltage ripple on the internal bus 108 may enable the bus capacitor 110 to be smaller, lighter, cooler, more efficient, cheaper, or combinations thereof. The process control circuitry 102 may be configured to tune the voltage ripple to a minimum value for any inductance 100 of the power cables 24. In this way, the inductance 100 may change during operation of the welding system or between welding operations without affecting the voltage ripple on the internal bus 108 and/or welding output from the buck converter 106.

The input power is received from the welding power source along the power cable 24 coupled to the input terminals 40. In some embodiments, the input terminals 40 have the first input connection 112 and the second input connection 114 with respective defined polarities. As discussed above, the first and second terminals 26, 28 have a positive and negative polarity, thus the input power is polarized. In some embodiments, sensing circuitry 116 is configured to detect the polarity of the polarized input power supplied to the first and second input connections 112, 114 using the input sensors 118. The sensing circuitry 116 may be configured to detect a mismatch between the polarities of the first and second terminals 26, 28 and defined polarities of the first and second input connections 112, 114. The process control circuitry 102 coupled to the sensing circuitry 116 may be configured to provide the polarized input power to the power conversion circuitry 58 only if the detected input power polarity corresponds to the defined polarities of the first and second input connections 112, 114. The advanced process wire feeder 20 may be configured to supply a polarized welding output for a particular welding application. Switching the polarity of the first and second terminals 26, 28 so that the terminals 26, 28 do not correspond to the first and second input connections 112, 114 may switch the polarity of the power cable 62 and work cable 64 from DCEN to DCEP, or from DCEP to DCEN.

In some embodiments, the advanced process wire feeder 20 is configured to notify the operator of the polarity and/or switch the polarity of the input power automatically. For example, the process operator interface 66 and/or control operator interface 68 may be configured to provide an operator-perceptible notification if the polarity of the polarized input power does not correspond to the defined polarities of the first and second input connections 112, 114. The communications circuitry may be configured to send and receive command and/or feedback signals over the power cable to the welding power source. The communications circuitry sends a signal indicative of a mismatch between the polarities of the input connections so that the welding power source may provide an operator-perceptible notification of the polarity and/or reverse the polarity of the input power. In some embodiments, polarity reversing circuitry 36 (FIG. 1) of the welding power source reverses the polarity of the polarized input power based upon the signal such that the polarity of the polarized input power corresponds to the defined polarities of the first and second input connections 112, 114.

The sensing circuitry 116 is also configured to measure the current and/or voltage of the internal bus 108 with bus sensors 120 and to measure the current and/or voltage of the welding output with welding output sensors 122. The process control circuitry 102 monitors the input sensors 118, bus sensors 120, and welding output sensors 122 through the sensing circuitry 116. Upon detection of a change of the polarized input power and/or the welding output to a value outside of a threshold range, the process control circuitry 102 may open relay circuitry 124 to interrupt provision of the polarized input power to the operational components of the welding wire feeder 20. The operational components may include, but are not limited to, the power conversion circuitry 58, the welding wire feed drive 90, or the wire feed control circuitry, or any combination thereof. The threshold range has a maximum threshold value (e.g., approximately 80V, 100V, 120V, or more) and a minimum threshold value (e.g., approximately 20V, 25V, or 30V). Operating the power conversion circuitry when the polarized input power and/or the welding output are within the threshold range may increase the stability or consistency of the conversion. For example, a short circuit downstream of the relay circuitry 124 may cause a voltage decline across the internal bus 108 and/or voltage decline of the welding output. Opening the relay circuitry 124 may protect at least the relay circuitry 124 from excess input power due to the short circuit downstream. The relay circuitry 124 may include circuit elements such as a latching relay, non-latching relay, solid state switches, and so forth. The relay circuitry 124 is configured to close to provide input power and to open to interrupt input power to the power conversion circuitry 58. In some embodiments, power storage circuitry may provide power to open the relay circuitry 124 and interrupt input power. The power storage circuitry may include an auxiliary power source 126 and/or the bus capacitor 110 on the internal bus 108.

Presently contemplated embodiments of the relay circuitry 124 include a power relay 128 and bypass circuitry 130 coupled in parallel at first and second relay junctions 132, 134. The power relay 128 may be a latching relay or a non-latching relay configured to carry high amperage DC along a first current path 129 when closed. A latching relay may be smaller and lighter than a non-latching relay with the same current capacity. In some embodiments, the power relay 128 may be the Relay Type 753 manufactured by Gruner of Wehingen, Germany. The bypass circuitry 130 may include, but is not limited to, a drive circuit, a voltage clamping device (e.g., metal oxide resistor), and one or more switches responsive to drive signals from the drive circuit. The one or more switches are configured to carry current along a second current path 131 when closed. The voltage clamping device may be configured to clamp the voltage across the first and second relay junctions 132, 134 in response to a voltage spike (e.g., rapid increase or decrease) across the relay circuitry 124. The voltage spike may cause a large current to otherwise flow along the first and/or second current path 129, 131. The voltage clamping device may be configured to dissipate some of the energy stored in the inductance 100 of the power cables 24. In some embodiments, the bypass circuitry 130 may include at least a pair of switches to protect the drive circuit if the polarities of the first and second terminals 26, 28 do not correspond to the respective defined polarities of the coupled first and second terminals 112, 114. The bypass circuitry 130 may also include multiple solid state switches (e.g., transistors) coupled in parallel to the power relay 128 to provide a desired current carrying capacity, such as the high amperage DC input power. The drive circuit may be the process control circuitry 102 or a separate circuit controlled by the process control circuitry 102.

The process control circuitry 102 is configured to apply signals to the power relay 128 to open and close the power relay 128, and to apply signals to the bypass circuitry 130 to open and close the bypass circuitry 130 in coordination with opening and closing the power relay 128. In some embodiments, the signals to open and close the power relay 128 and to open and close the bypass circuitry 130 are applied substantially simultaneously. The bypass circuitry 130 may be configured to carry a fraction of the input power along the second current path 131 to the power conversion circuitry 58 for a short time to reduce the remainder of the input power carried along the first current path 129 through the power relay 128 for that short time. When closed, the switches of the bypass circuitry 130 are configured to reduce the current across the power relay 128 to enable the power relay 128 to open or close without arcing and/or using magnetic blowouts. After the process control circuitry 102 signals the power relay 128 to open or close, the process control circuitry 102 signals the switches of the bypass circuitry 130 to open to interrupt the fraction of the input power along the second current path 131. The switches of the bypass circuitry 130 may be configured to carry the input power along the second current path 131 for the short time while the power relay 128 is opened or closed.

The power relay 128 is closed to provide input power to the power conversion circuitry 58 during welding. In some embodiments, the process control circuitry 102 coupled to the sensing circuitry 116 is configured to monitor the voltage of the input power and the voltage across the internal bus 108. The control circuitry 102 is configured to open the power relay 128 based at least in part on a decline of either the input voltage or the voltage across the internal bus 108, which may indicate a short circuit downstream of the relay circuitry 124. The process control circuitry 102 may actuate the power relay 130 with power stored in a power storage circuit, such as the auxiliary power supply 126 or the bus capacitor 110. For example, the process control circuitry 102 may discharge the power storage circuit to power a coil to open or close the power relay 128

In some embodiments, a power storage circuit may be charged before the welding power source provides input power suitable for conversion to welding output. The power storage circuit (e.g., bus capacitor 110) on the internal bus 108, may be charged by the received input current at an initial level. In some embodiments, the process control circuitry 102 transmits a precharge signal to the welding power source to reduce the input current of the input power to the initial level. The sensing circuitry 116 may sense the charge of the power storage circuit with the bus sensors 120. In some embodiments, the process control circuitry 102 may initiate a signal to the welding power source to increase the input current to a greater level based upon a comparison between the input power voltage and the voltage across the internal bus 108. In some embodiments, the process control signal receives the input current at the greater level after the first current path 129 is closed and the second current path 131 is opened. Receiving input current at an initial level first, and then receiving input current at a greater level enables a staged initialization of the advanced process wire feeder 20 to reduce the inrush current and input power drawn by the process control circuitry 102 and/or the power conversion circuitry 58. For example, the process control circuitry 102 may initiate the signal to the welding power source when the bus voltage is approximately 50%, 75%, or 100% of the input power voltage. In some embodiments, the signal is sent to the welding power source via the communications circuitry 70 and power cable 24.

The bus capacitor 110 between the boost converter 104 and the buck converter 106 may perform several functions within the advanced process wire feeder 20. The bus capacitor 110 may store power to open or close the relay circuitry 124 to interrupt the input power flow to the operational components (e.g., power conversion circuitry 58, wire feed drive 90, wire feed control circuitry 136). The process control circuitry 102 may open or close the relay circuitry 124 based on the voltage of the bus capacitor 110 and/or the input connections 112, 114. The process control circuitry 102 may also send the signal to the welding power source based at least in part on the sensed voltage of the bus capacitor 110 and/or input connections 112, 114.

In some embodiments, the bypass circuitry 130 is configured to prevent the power relay 128 from closing if there is a short circuit downstream of the relay circuitry 124. The process control circuitry 102 may test the advanced process feeder 20 by closing the second current path 131 to determine if the voltage of the internal bus 108 may increase. In the case of a short circuit downstream of the relay circuitry 124, the voltage of the internal bus 108 would not increase. When the process control circuitry 102 determines that the voltage of the internal bus 108 may increase, the process control circuitry 102 may close the power relay 128 to enable input power to flow to the power conversion circuitry 58. Testing the advanced process wire feeder 20 for a short circuit downstream of the relay circuitry 124 enables the power relay 128 to remain open in the event of a short circuit.

The wire feed assembly 60 is controlled by wire feed control circuitry 136 coupled to the wire feed drive 90. The wire feed control circuitry 136 may be coupled to the process operator interface 66, the control operator interface 68, and the process control circuitry 102. The wire feed control circuitry 136 controls the wire feed drive 90 to supply the welding wire 54 to the weld cable 62 based at least in part on parameters received via the process operator interface 66 and control operator interface 68. As discussed above, the process operator interface 66 may be configured to receive inputs for gas parameters. The valve assembly 72 coupled to the gas line 74 is configured to be controlled by the process control circuitry 102 and/or the wire feed control circuitry 136.

Figure 6:
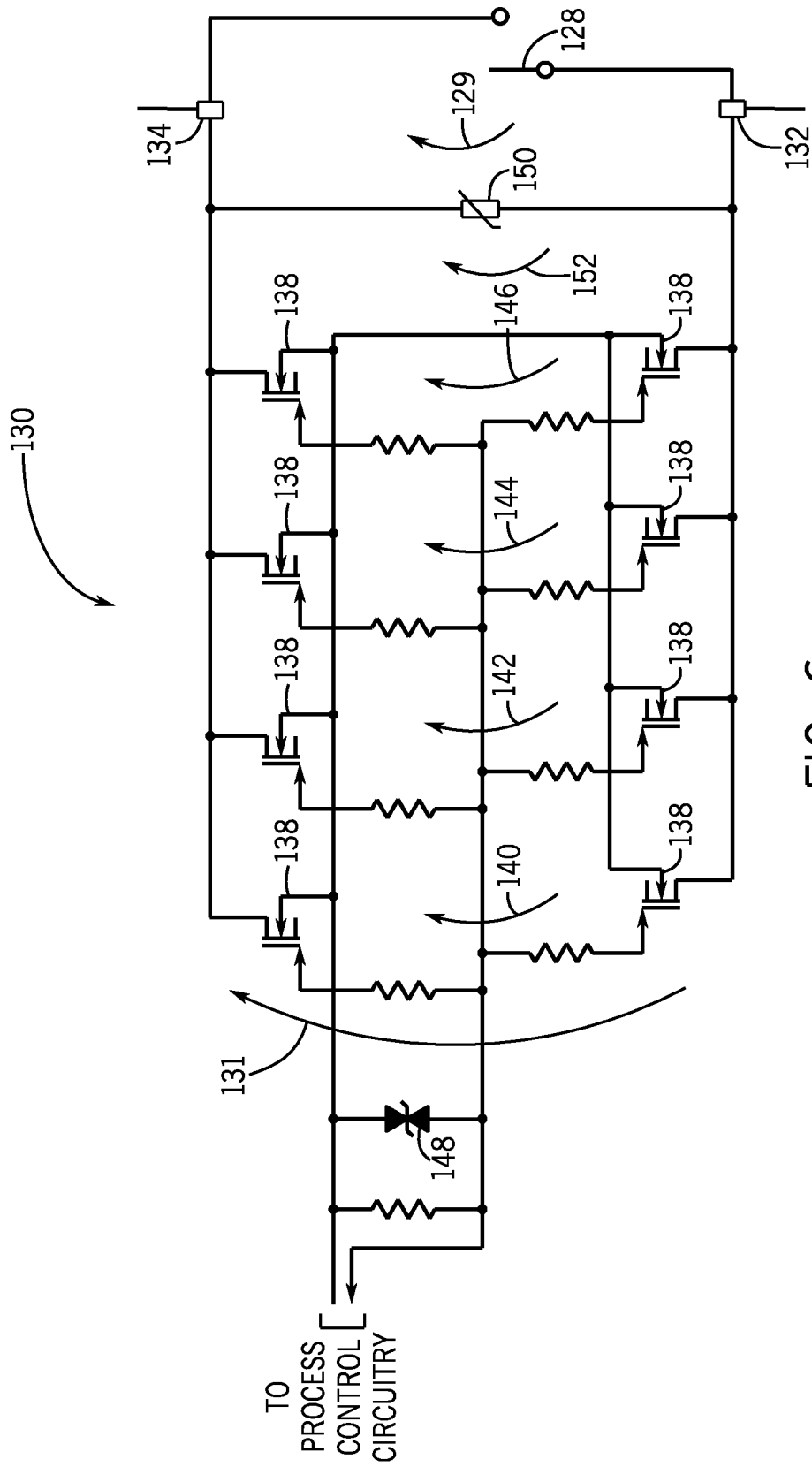
FIG. 6 is a schematic diagram of an embodiment of the relay circuitry of FIG. 5.

FIG. 6 illustrates a schematic diagram of an embodiment of the bypass circuitry 130 of FIG. 5 along line 6-6. As described above, the bypass circuitry 130 is coupled in parallel with the power relay 128 at the first and second relay junctions 132, 134. The bypass circuitry 130 includes one or more switches 138, such as metal-oxide-semiconductor field-effect transistors (MOSFETs), coupled in parallel to the power relay 128. In some embodiments, the solid state switches may be arranged in an anti-series parallel configuration. The power relay 128 and the bypass circuitry 130 are controlled by the process control circuitry to open and close at substantially the same time to reduce arcing across the power relay 128. Closing the power relay 128 enables current to flow along the first current path 129 and closing the switches 138 enables current to flow along the second current path 131. The second current path 131 may include a number of branches 140, 142, 144, and 146 between parallel switches. Changing the number of branches affects the current carrying capacity along the second current path 131, thus affecting the current along the first path 129 when the power relay 128 is actuated. Reducing the current along the first path 129 when actuating the power relay 128 reduces arcing between contacts of the power relay. The process control circuitry is configured to control the one or more switches 138 through a gate 148 or other control switch to open and close the one or more switches 138 simultaneously or sequentially. The one or more switches 138 are configured to be open unless controlled by the process control circuitry to close.

Upon receiving control signals from the process control circuitry, the one or more switches 138 are configured to close, opening the second current path 131. While the one or more switches 138 are closed, the process control circuitry controls the power relay 128 to actuate open or closed with a reduced current along the first current path 129 due to the current along the second current path 131. After the power relay 128 is actuated open or closed, the process control circuitry opens the one or more switches 138 to open the second current path 131. The control signals from controlling the one or more switches 138 and the power relay 128 may be pulses that open and close the first and second current paths 129, 131 substantially simultaneously. That is, the power relay 128 may open and close the first and second current paths 129, 131 in approximately 5 to 50 milliseconds, 10 to 40 milliseconds, or approximately 20 to 30 milliseconds.

The bypass circuitry 130 includes a voltage clamping device 150 (e.g., (e.g., metal oxide resistor, varistor) to protect the one or more switches 138 and power relay 128 from over-voltages. Upon opening the power relay 128, the voltage between the first and second relay junctions 132, 134 may increase as the bus capacitor, power cables, and/or auxiliary power source, or other circuitry releases stored charge. The voltage clamping device 150 is configured to have greater electrical resistance at higher voltages than at lower voltages. The voltage clamping device 150 carries more current along the third current path 152 as the voltage between the first and second relay junctions 132, 134 increases to maintain the current along the first and second current paths 129, 131 below threshold levels.

Figure 7:
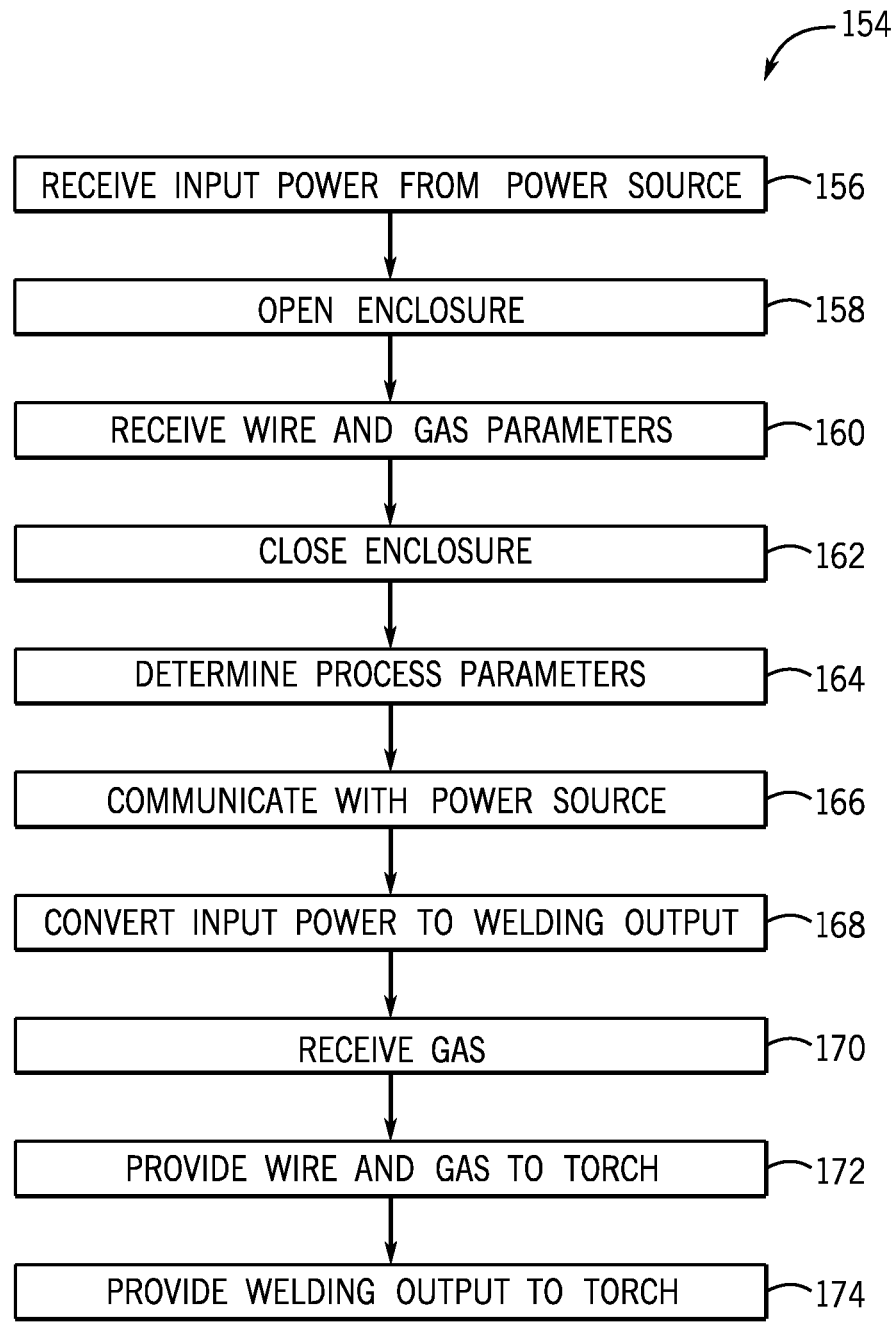
FIG. 7 is a flow chart of an embodiment of a process for producing controlled waveform output using an advanced process wire feeder.

The advanced process wire feeder of FIG. 5 may be utilized according to multiple methods as illustrated in FIGS. 7-10. Some embodiments of the advanced process wire feeder may be utilized with all of the illustrated embodiments of FIGS. 7-10. Other embodiments of the advanced process wire feeder may be utilized with only some of the illustrated embodiments of FIGS. 7-10. FIG. 7 illustrates a method 154 of converting input power to controlled waveform welding output within an advanced process wire feeder. The first step 156 of the method is to receive input power from the welding power source. In some embodiments, the input power may be a polarized DC input power of approximately 80V. The input power may not be suitable for a controlled waveform welding process if it was directly supplied to the welding torch. In step 158, an operator may open the enclosure of the advanced process wire feeder. The operator may open the enclosure to install or change the welding wire spool or to adjust parameters relating to the welding wire and gas supply. At step 160, the process operator interface within the enclosure receives the wire and/or gas parameter before the enclosure is closed at step 162. At step 164, the process control circuitry determines the process parameters. The process parameters include a controlled waveform output, the amperage, the feed rate of the welding wire, and so forth. The process parameters may be determined based on the parameters received through the process operator interface. In some embodiments, the control circuitry automatically determines the process parameters for a controlled waveform welding output based on code and/or instructions stored in memory without direct selection of the process type by the operator. The advanced process wire feeder may communicate with the welding power source at step 166 to adjust the input power based at least in part on the received process and/or wire parameters. In some embodiments, step 166 may occur at any time during operation of the advanced process wire feeder. At block 168, the advanced process wire feeder converts the input power to welding output. The welding output may be a controlled waveform welding output suitable for a short circuit or pulsed welding process. The welding output converted by the power conversion circuitry within the advanced process wire feeder is not attenuated by inductance of the power cable coupled to the welding power source. The advanced process wire feeder receives shielding gas at step 170. The shielding gas may be supplied through the welding power source or a separate gas supply. At step 172, the advanced process wire feeder provides the wire and gas to the welding torch based at least in part on the input received at steps 160 and 164. At step 174, the welding output is provided to the welding torch, based at least in part on the input received at step 164. The welding output may be suitable for a controlled waveform welding process because of the relatively short distance and low inductance between the power conversion circuitry and the welding torch.

Figure 8:
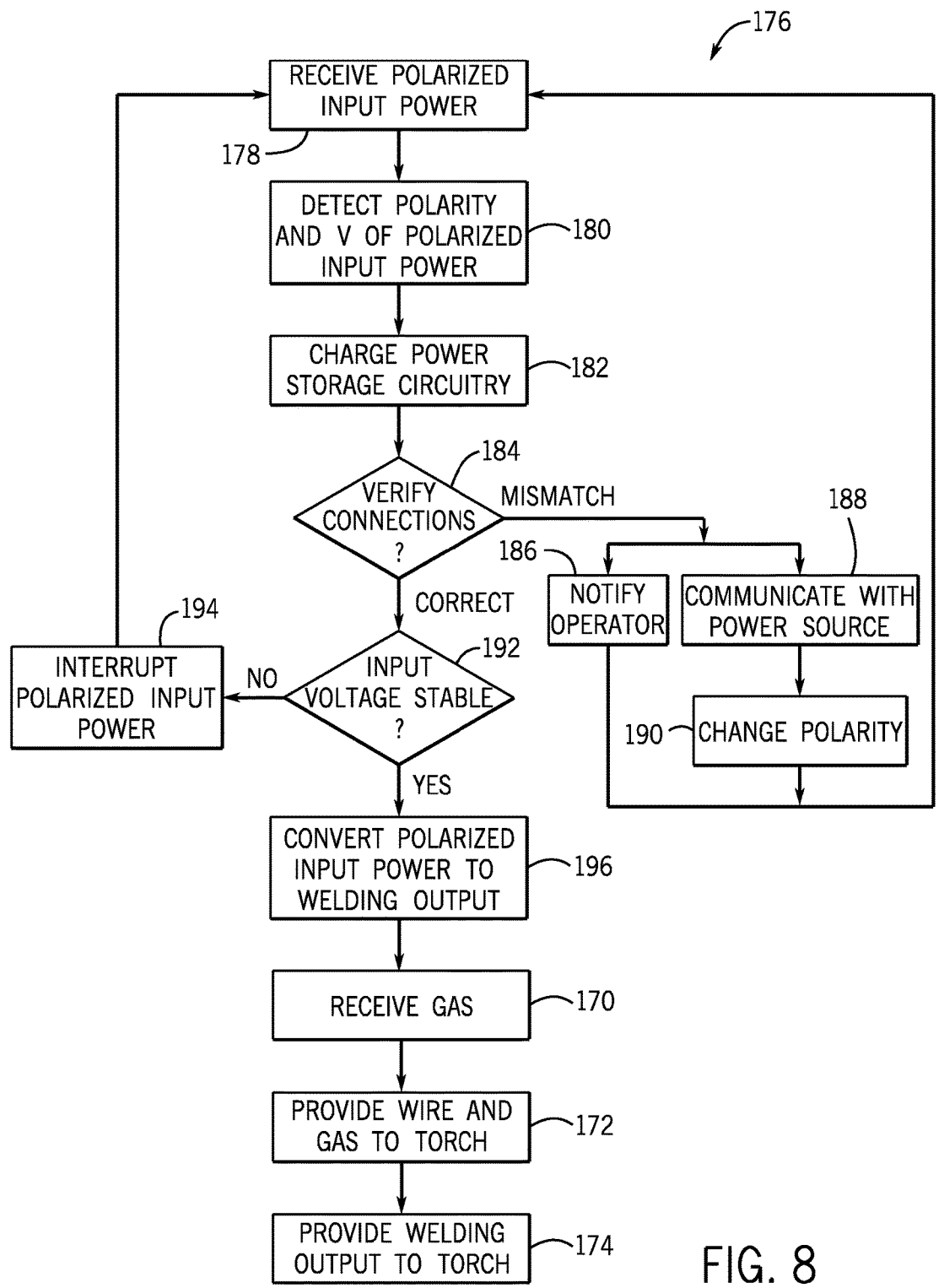
FIG. 8 is a flow chart of an embodiment of a process for sensing polarity of input power supplied to an advanced process wire feeder.

FIG. 8 illustrates a method 176 of sensing the polarity of the input power received by the advanced process wire feeder. At step 178, the advanced process wire feeder receives polarized input power from the welding power source. The polarized input power is supplied along first and second terminals of the power cable. The input power is received at two input connections, each with a defined polarity. At block 180, sensing circuitry detects the polarity and voltage of the polarized input power with input sensors at the first and second input connections. In some embodiments, at block 182, the received input power may charge power storage circuitry, such as an auxiliary power source and/or a bus capacitor.

Upon detecting the polarity of the input power at step 180, the sensing circuitry verifies at node 184 whether the first and second terminals correspond to the defined polarities of the input connections. If there is a mismatch between the polarities, process control circuitry within the advanced process wire feeder may notify the operator with an operator-perceptible notification of the mismatched polarity through the process operator interface, the control operator interface, and/or the welding power source. Alternatively, at block 188 the process control circuitry may communicate with the welding power source to direct the welding power source to change the polarity of the input power as shown at block 190. If the polarity of the input power matches the polarity of the defined polarity connections, then the process control circuitry determines at node 192 whether the input power and input voltage is substantially stable. If the input voltage is stable, the input power is supplied to the power conversion circuitry. The process control circuitry may periodically sense and determine whether the input voltage is stable at node 192 during the welding process. If the input voltage is not stable, the process control circuitry may interrupt the polarized input power supply to the power conversion circuitry. The process control circuitry may interrupt the polarized input power by opening a power relay upstream of the power conversion circuitry and/or communicating with the welding power source to cease supplying the advanced process wire feeder with input power. If the input power is interrupted, the method 176 may be repeated from step 178 when polarized input power is received.

If the input voltage is stable, the input power is supplied to the power conversion circuitry to convert the polarized input power to welding output at block 196. The welding output may be a controlled waveform welding output suitable for a short circuit or pulsed welding process. Additionally, the welding output may be suitable for a FCAW process or GMAW welding process. The welding output converted by the power conversion circuitry within the advanced process wire feeder 20 is not attenuated by inductance of the power cable coupled to the welding power source. The advanced process wire feeder receives shielding gas at step 170. The shielding gas may be supplied through the welding power source or a separate gas supply. At step 172, the advanced process wire feeder provides the wire and gas to the welding torch. At step 174, the welding output is provided to the welding torch. The welding output provided may be suitable for a controlled waveform welding process because of the relatively short distance and low inductance between the power conversion circuitry and the welding torch.

Figure 9A:
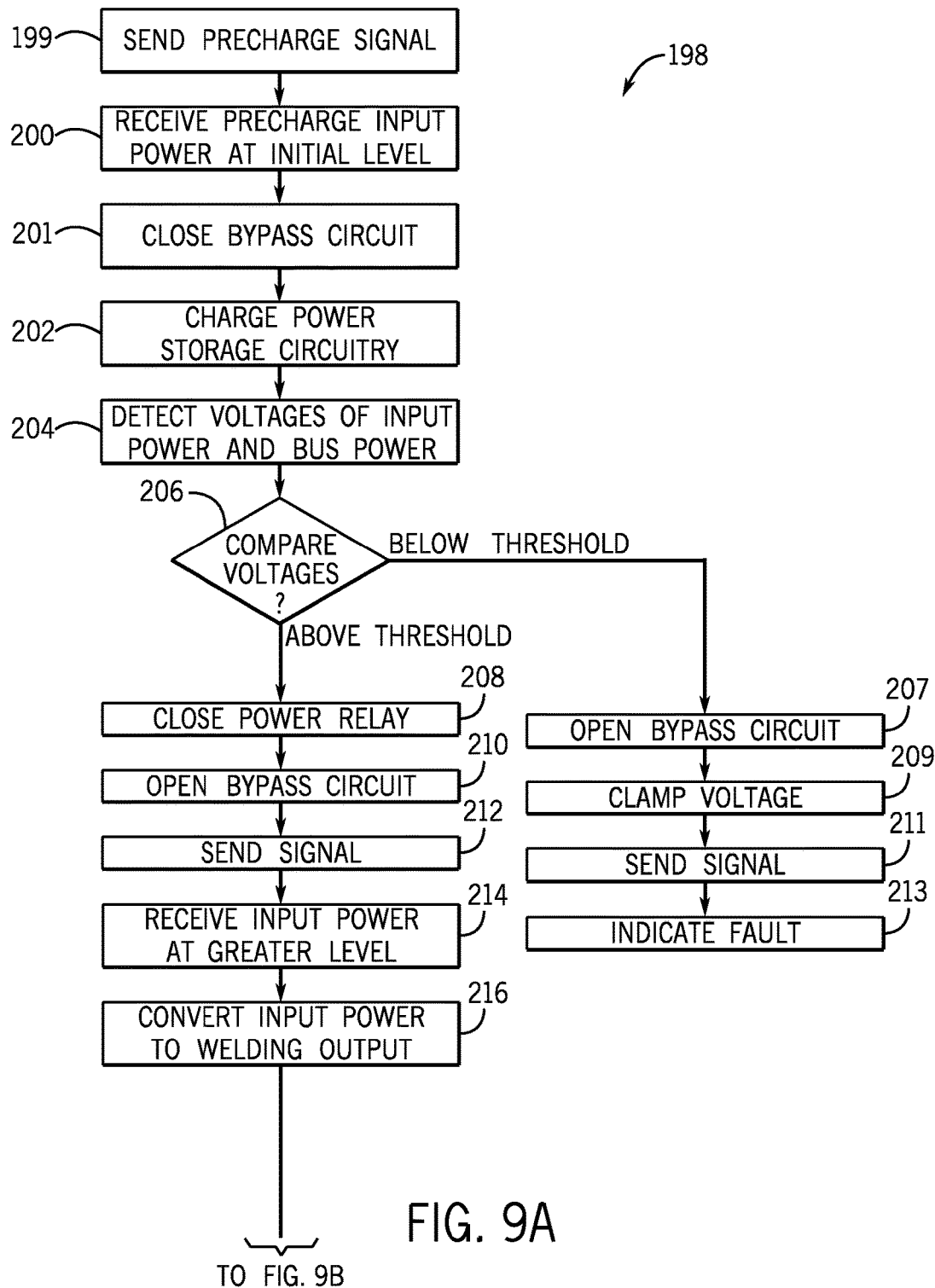
FIG. 9A is a first part of a flow chart of an embodiment of a process for actuating relay circuitry of an advanced process wire feeder.

FIG. 9A illustrates a first part of a method 198 of precharging circuit elements of the advanced process wire feeder and using bypass circuitry in parallel with the power relay. The advanced process wire feeder sends a precharge signal to the welding power source at step 199 when the advanced process wire feeder is electrically coupled to the welding power source. The precharge signal directs the welding power source to limit the current of the precharge input power to an initial level. At step 200, the advanced process wire feeder receives the input power at the initial level. At step 201, the process control circuitry sends a control signal to the bypass circuit to close the second current path to transmit the input power at the initial level to the power storage circuitry (e.g., bus capacitor on the internal bus). The input power at the initial level charges power storage circuitry (e.g., bus capacitor) at step 202. The sensing circuitry detects the voltages of the input power and bus power at step 204. The voltage of the bus power is a measure of the power stored in the bus capacitor. At node 206, the process control circuitry compares the voltages of the input power and the bus power. In some embodiments at node 206, the process control circuitry tests the relay circuitry as described above with FIG. 5 to determine the presence of a short circuit downstream of the relay circuitry. If a short circuit is present downstream (e.g., the voltage is below a threshold), the process control circuitry may not close the power relay so that the input power does not pass through the short circuit. The process control circuitry may open the bypass circuit at block 207 in case of a short downstream. After the bypass circuit opens, the voltage clamping device clamps the voltage at block 209 to at least partially protect the relay circuitry. The process control circuitry may send a signal at block 211 to the welding power source, the process operator interface, and/or the control operator interface. In some embodiments, the signal may control the welding power source to halt production of the input power. In other embodiments, the signal controls the operator interface to indicate a fault (e.g., short circuit) at block 213 to the operator. If the voltage of the bus power is above a threshold (e.g., the power storage circuitry is charged) and no short circuit is present, the process control circuitry sends a control signal to the power relay to close the first current path at step 208.

After the power relay is closed, at step 210 the process control circuitry sends a control signal to the bypass circuit to open the second current path. In some embodiments, the process control circuitry sends a signal to the welding power source at block 212. The signal directs the welding power source to increase the current of the input power to a greater level. In other embodiments, the welding power source is configured to increase the current to the greater level after a defined period of time after step 210. In some embodiments, the process control circuitry of the advanced process wire feeder may perform the steps 208 and 210 substantially simultaneously, or within less than approximately 50 milliseconds, less than approximately 30 milliseconds, or less than approximately 15 milliseconds. The advanced process wire feeder receives the input power at the greater level at block 214. The input power at the greater level is suitable for conversion to welding output at block 216 for a desired welding process.

Figure 9B:
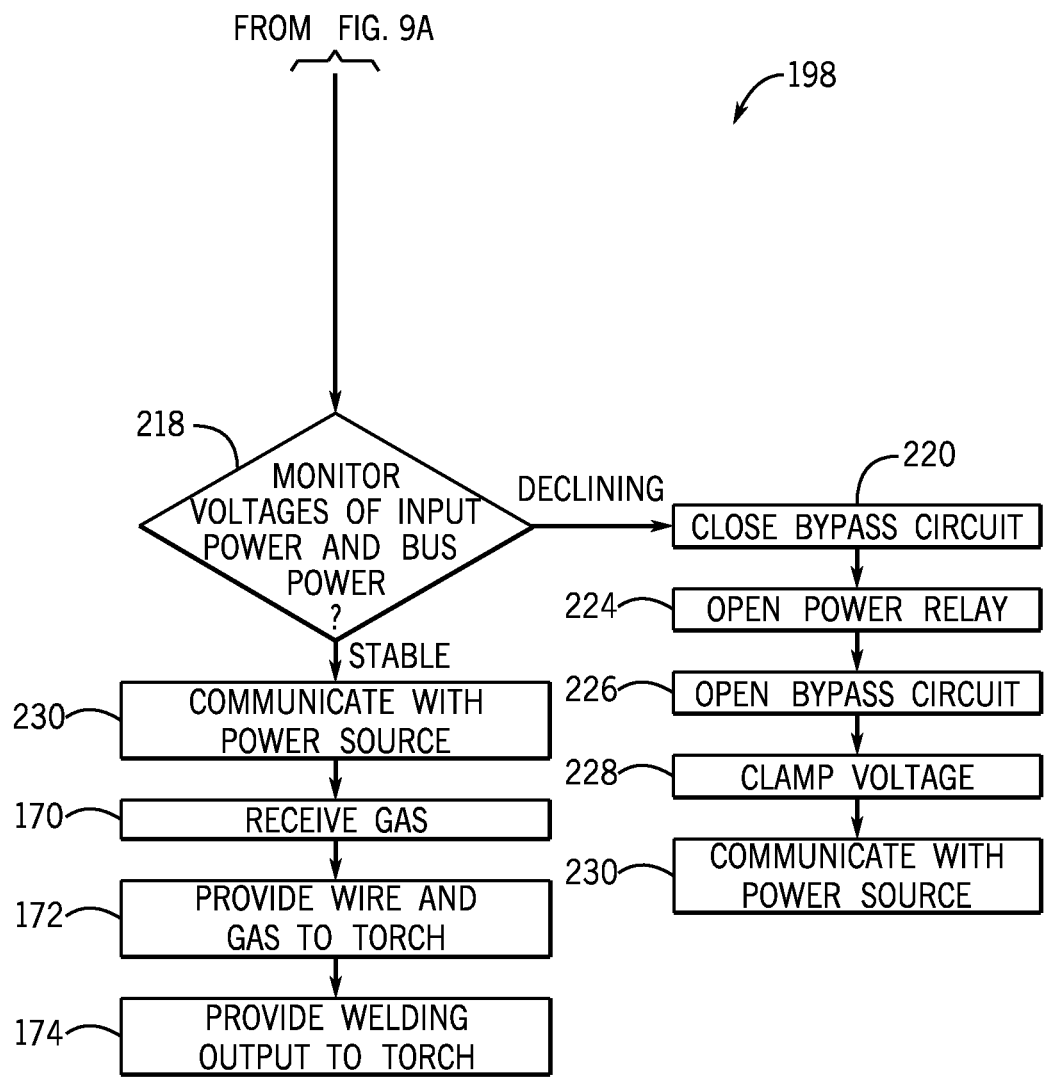
FIG. 9B is a second part of the flow chart of FIG. 9A of the process for actuating relay circuitry of the advanced process feeder.

The power conversion circuitry of the advanced process wire feeder converts the input power at the greater level to welding output at step 216. The welding output may be a controlled waveform welding output suitable for a short circuit or pulsed welding process. Additionally, the welding output may be suitable for a FCAW process or GMAW welding process. The welding output converted by the power conversion circuitry within the advanced process wire feeder is not attenuated by inductance of the power cable coupled to the welding power source. FIG. 9B illustrates a second part of the method 198 that may be configured during and after block 216. During a welding process, at node 218, sensing circuitry monitors voltages of input power and bus power to control the relay circuitry. In some embodiments, the sensing circuitry may also detect the polarity of the input power as described above with method 176 in FIG. 8 to notify the operator of a polarity mismatch or reverse the polarity at the welding power source.

If the sensing circuitry detects a declining voltage across the internal bus and/or a declining voltage of the input power, the process control circuitry actuates the relay circuitry in steps 220, 224, and 226 to interrupt the input power to the power conversion circuitry. The process control circuitry sends a control signal to the bypass circuit at step 220 to close the second current path. At the same time or shortly after step 220, the process control circuitry sends a control signal to the power relay at step 224 to open the first current path. The process control circuitry may discharge at least some of the power storage circuit to drive the power relay open. For example, the power storage circuit may store power to drive a magnetic coil to open power relay upon receipt of a control signal from the process control circuitry. After the power relay is open, at step 226 the process control circuitry sends a control signal to the bypass circuit to open the second current path. In some embodiments, the process control circuitry of the advanced process wire feeder may perform the steps 220, 224, and 226 substantially simultaneously, or within less than approximately 50 milliseconds, less than approximately 30 milliseconds, or less than approximately 15 milliseconds. After the first and second current paths are open, the voltage across the relay circuitry may increase due to power stored within the power cables and/or power storage circuit. A voltage clamping device of the relay circuitry clamps the voltage at block 228 to reduce the effects of the stored energy on the power relay or bypass circuit. Throughout the method 198, such as if the sensing circuitry detects stable voltages of the input power and bus power, the advanced process wire feeder may communicate with the welding power source at step 230. The advanced process wire feeder may direct the welding power source to adjust the input power (e.g., cease supplying the input power).

The advanced process wire feeder receives shielding gas at step 170. The shielding gas may be supplied through the welding power source or a separate gas supply. At step 172, the advanced process wire feeder provides the wire and gas to the welding torch. At step 174, the welding output is provided to the welding torch. The welding output provided may be suitable for a controlled waveform welding process because of the relatively short distance and low inductance between the power conversion circuitry and the welding torch.

Figure 10:
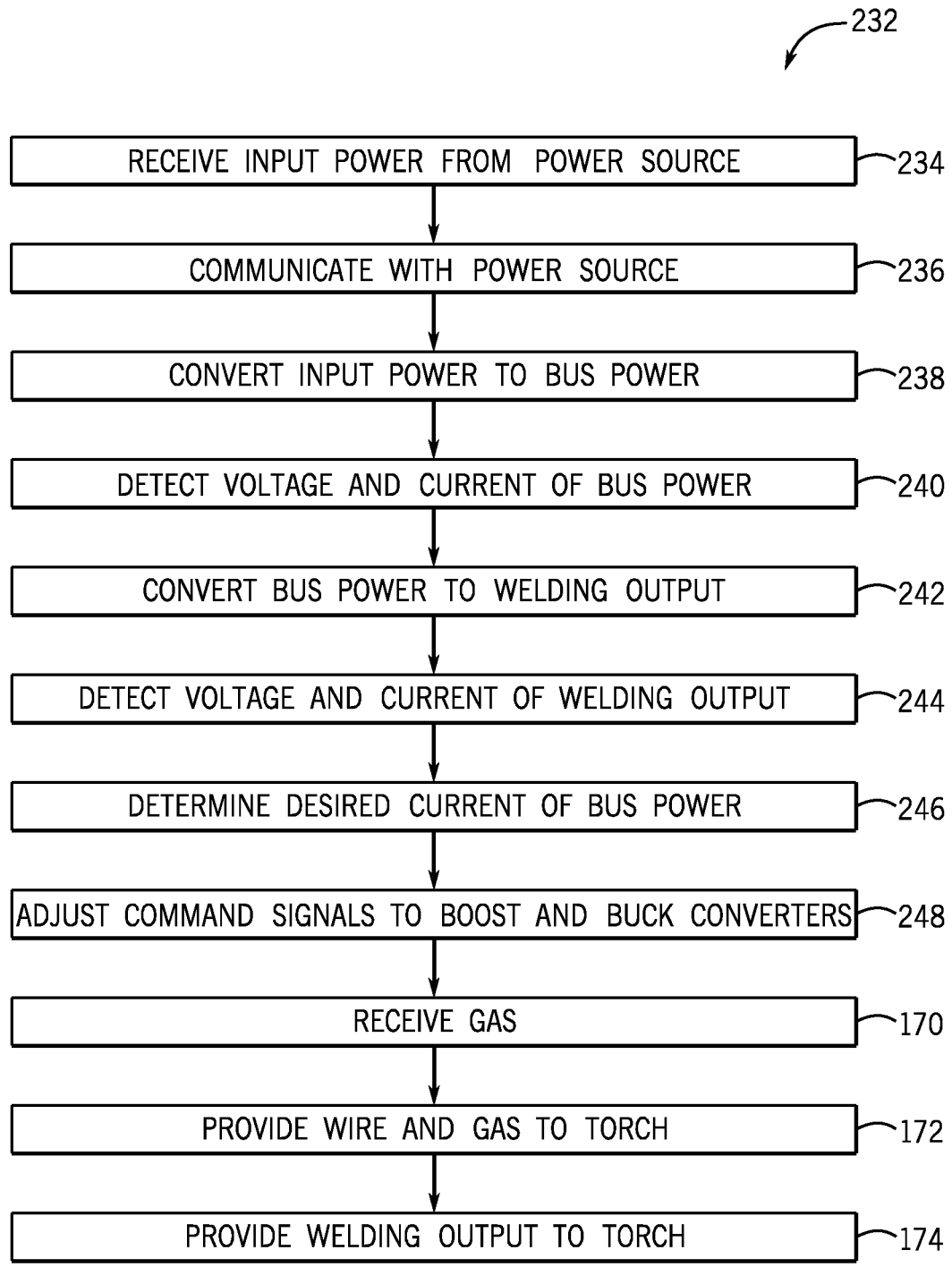
FIG. 10 is a flow chart of an embodiment of a process for adjusting power conversion circuitry of an advanced process wire feeder.

FIG. 10 illustrates a method 232 of controlling the current of the input power to reduce voltage ripple on the internal bus. The first step 234 of the method 232 is to receive input power from the welding power source. In some embodiments, the input power may be a polarized DC input power of approximately 80V. Throughout the method 232, the advanced process wire feeder may communicate with the welding power source as shown at step 236. The boost converter of the power conversion circuitry receives the input power and converts the input power to bus power at step 238. The bus power is transmitted from the boost converter to the buck converter along the internal bus. Sensing circuitry detects the current and voltage of the bus power at step 240. At step 242, the buck converter converts the bus power from the internal bus to welding output. The welding output may be a controlled waveform welding output suitable for a short circuit or pulsed welding process. Additionally, the welding output may be suitable for a FCAW process or GMAW welding process. The sensing circuitry also detects the current and voltage of the welding output at step 244.

The process control circuitry receives the detected currents and processes the detected measurements to adjust the power conversion circuitry. In some embodiments, the process control circuitry is configured to determine the desired current of bus power to reduce the voltage ripple across the internal bus. The process control circuitry may determine the desired current of bus power by determining the product of the welding output current and voltage, determining the sum of the product and a conversion loss, and dividing the sum by the bus voltage. The process control circuitry may adjust the command signals to the boost and buck converters at step 248 based on the detected current and voltage measurements from steps 240 and 244. In some embodiments, the process control circuitry adjusts the command signals to the power conversion circuitry to substantially match in time the bus power entering the internal bus with the bus power entering the buck converter. This reduces the voltage ripple across the internal bus. The process control circuitry is configured to adjust the current of the bus power based at least in part on the welding output. In some embodiments, the process control circuitry is configured to adjust the duty cycle of switches within the boost converter to advance or delay in time (e.g., phase shift) the conversion of input power to bus power. The process control circuitry is also configured to adjust the duty cycle of switches within the buck converter to advance or delay in time (e.g., phase shift) the conversion of bus power to welding output. In some embodiments, the process control circuitry is configured to dynamically adjust the boost converter and buck converter based on feedback to tune the voltage ripple to a minimum value. The process control circuitry is configured to tune the voltage ripple to the minimum value for any inductance of the power cables.

The advanced process wire feeder receives shielding gas at step 170. The shielding gas may be supplied through the welding power source or a separate gas supply. At step 172, the advanced process wire feeder provides the wire and gas to the welding torch. At step 174, the welding output is provided to the welding torch. The welding output provided may be suitable for a controlled waveform welding process because of the relatively short distance and low inductance between the power conversion circuitry and the welding torch.

Figure 11:
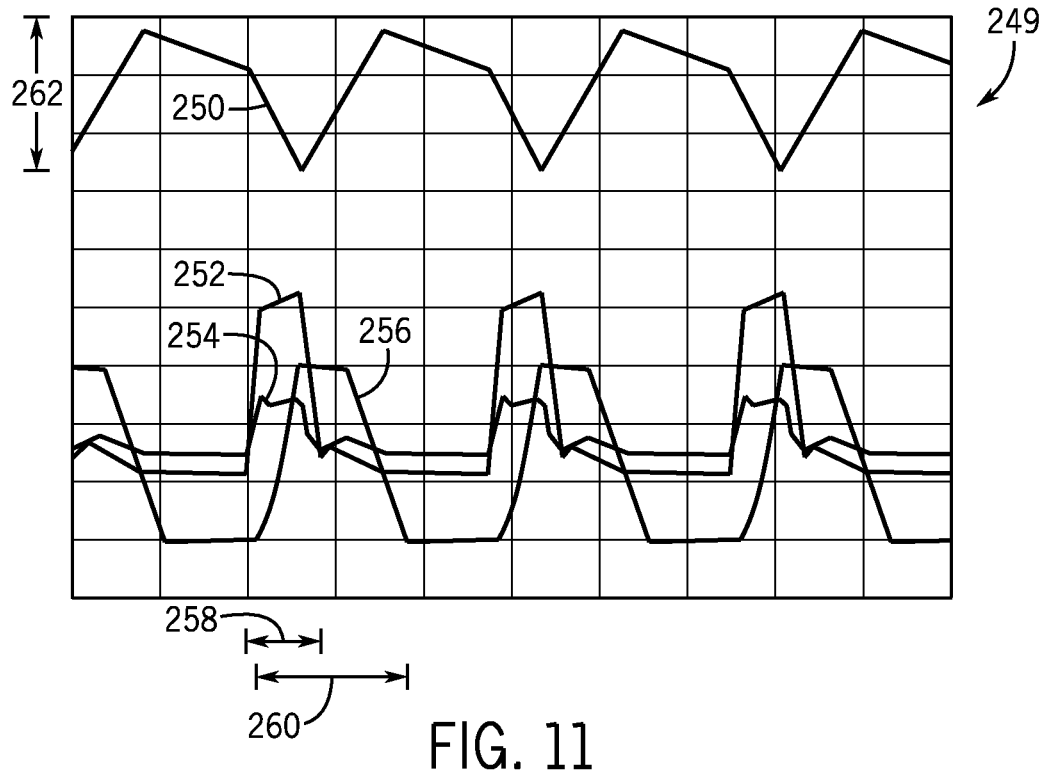
FIG. 11 is a chart of bus voltage, input current, output voltage, and output current versus time.

FIG. 11 is a chart 249 illustrating an embodiment of the bus voltage, input current, and welding output parameters versus time of the advanced process wire feeder without adjusting the power conversion circuitry. The chart 249 illustrates a series of input current pulses on the internal bus supplied by the boost converter, and the welding output drawn by the buck converter from the internal bus suitable for a controlled waveform welding process. The signal 250 is the voltage ripple as measured on the internal bus. The signal 252 is the output current of the welding output drawn by the buck converter, and the signal 254 is the output voltage of the welding output drawn by the buck converter. Signal 256 is the current of the converted bus power supplied by the boost converter from the input power. Each of the signals illustrated has a regular period, however, the output timing (e.g., phase) of the output current and voltages 252, 254 precedes the input timing (e.g., phase) of the bus current 256. That is, the timing of a peak 260 of the bus current 256 is offset (e.g., delayed) from the timing of peaks 258 of the welding output current 252 and welding output voltage 254. The relative time difference between the output peak 258 and the input peak 260 of the chart 249 causes the voltage ripple to have a large peak-to-peak amplitude 262.

Figure 12:
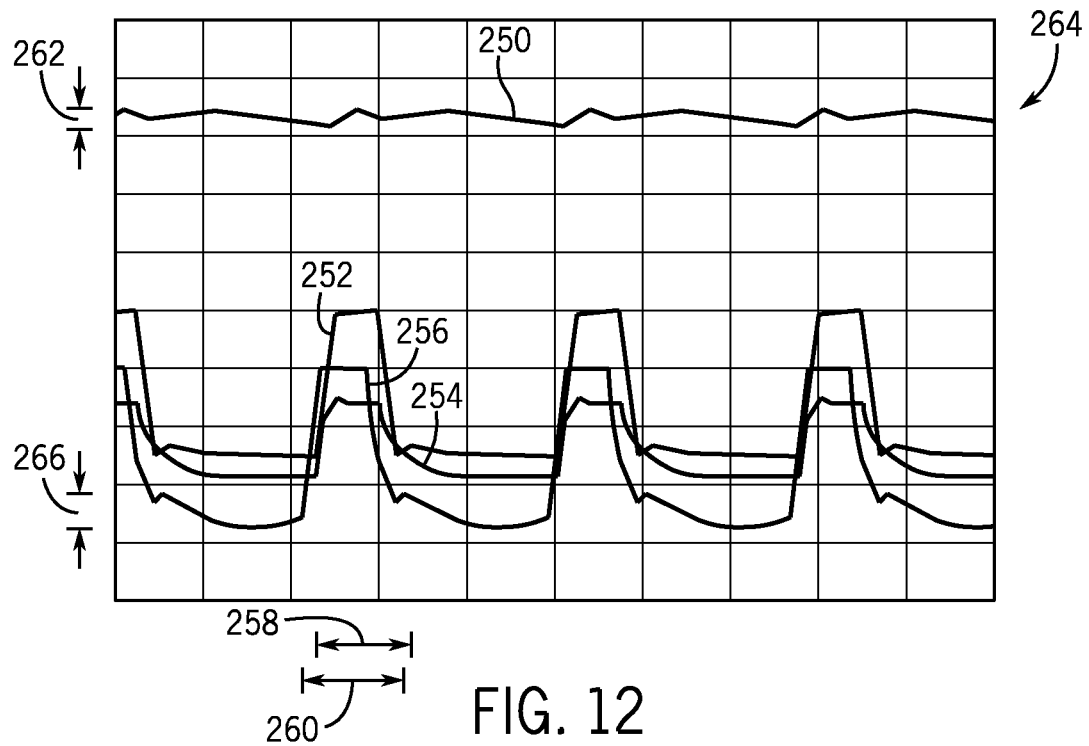
FIG. 12 is another chart of bus voltage, input current, output voltage, and output current versus time.

FIG. 12 is a chart 264 illustrating an embodiment of the bus voltage, input current, and welding output parameters versus time of the advanced process wire feeder for which the power conversion circuitry is adjusted to reduce the voltage ripple. In this embodiment, the peak-to-peak amplitude 262 of the voltage ripple 250 is substantially less than in chart 249 of FIG. 11. The process control circuitry controls the duty cycles of switches within the boost converter and/or the buck converter to reduce the voltage ripple 250. For example, the process control circuitry adjusts the timing of the output peak 258 of the output current and voltage, adjusts the timing of the input peak 260 of the bus current, or combinations thereof. FIG. 12 illustrate an embodiment in which the process control circuitry delays the timing of the output peak 258 to more closely coincide with the timing of the input peak 260, thereby reducing the peak-to-peak amplitude 262 of the voltage ripple 250. In some embodiments, the voltage ripple 250 is reduced when the input current 256 and input voltage signals are aligned in time with the output current 252 and the output voltage 254. The product of the input current 256 and the input voltage signals may be approximately equal to a sum of a conversion loss (e.g., from the boost converter and the buck converter) and the product of the output current 252 and the output voltage 254 signals. In some embodiments, the process control circuitry controls the conversion by the boost and buck converters to refine the shape of the pulsed waveforms to further reduce the voltage ripple. For example, the bus current 256 of the embodiment of chart 264 increases and decreases more rapidly than the embodiment of chart 249. Additionally, the process control circuitry may control the bus current 256 supplied by the boost converter to closely match the current of the welding output 252 drawn by the buck converter as illustrated in chart 264.

Figure 13:
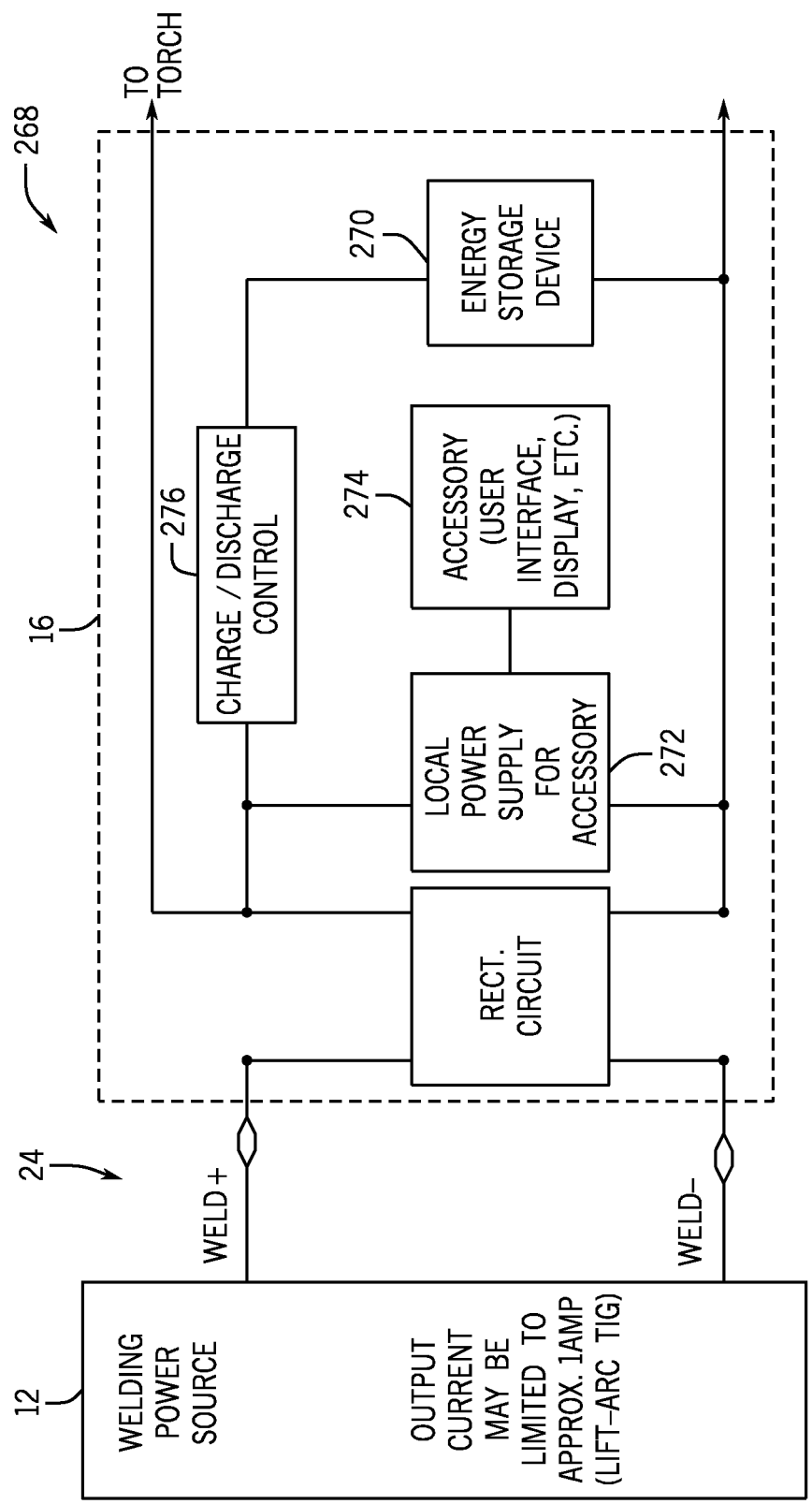
FIG. 13 is a diagram of an exemplary circuit for controlling application of power to a welding component such as a wire feeder or pendant during power-up or connection of the component to a welding power supply.

FIG. 13 illustrates an exemplary current management system as may be used in either a pendant coupled to a welding power source or in a remote wire feeder, of the types described above. The current management system, designated generally by reference numeral 268 is designed to be coupled to a welding power source 12 via a power cable 24. Because the welding power source 12 may often be live (i.e., powered and providing output power to the cables 24), the current management system 268 may serve multiple functions, such as to limit inrush current to energy storage devices within the remote component, and/or to delay application of current to the energy storage devices to avoid arcing at the terminal connections when the component is coupled to the live welding power source. In the illustrated embodiment, the current management system 268 includes at least one energy storage device 270 coupled to a local power supply 272 within the component. The local power supply may be used to provide power for various accessories 274, such as user interfaces, displays, and so forth. The energy storage device 270 may include one or more types of devices, such as capacitors, batteries, combinations of these, or any other suitable energy storage devices. A charge/discharge control circuit 276 is also provided for regulating application of current to the energy storage device 270 and for regulating the flow of power from the energy storage device. These devices may be coupled in a bussed circuit arrangement as illustrated, with welding power being provided to a welding torch in parallel with this circuitry. Moreover, current and voltage sensors may be incorporated into the circuitry for regulating operation of certain of the components, particularly during initial connection of the pendant or wire feeder to a power source and also during operation.

As described more fully below with reference to FIGS. 14 and 15, the current management system 268 serves to limit current into the energy storage device by operation of the charge/discharge control circuit. In particular, during use, the circuitry may ensure that the welding power output does not "starve" the local power supply 272, such as during arc starting (e.g., lift-arc starting in TIG operations). Moreover, the current draw can be made low enough via the circuitry to prevent arcing when the pendant or wire feeder is connected to a live welding power source. So further, energy from the energy storage device may be used to maintain power to the accessory 274 during loss of open circuit voltage (i.e., "ride-through").

Figure 14:
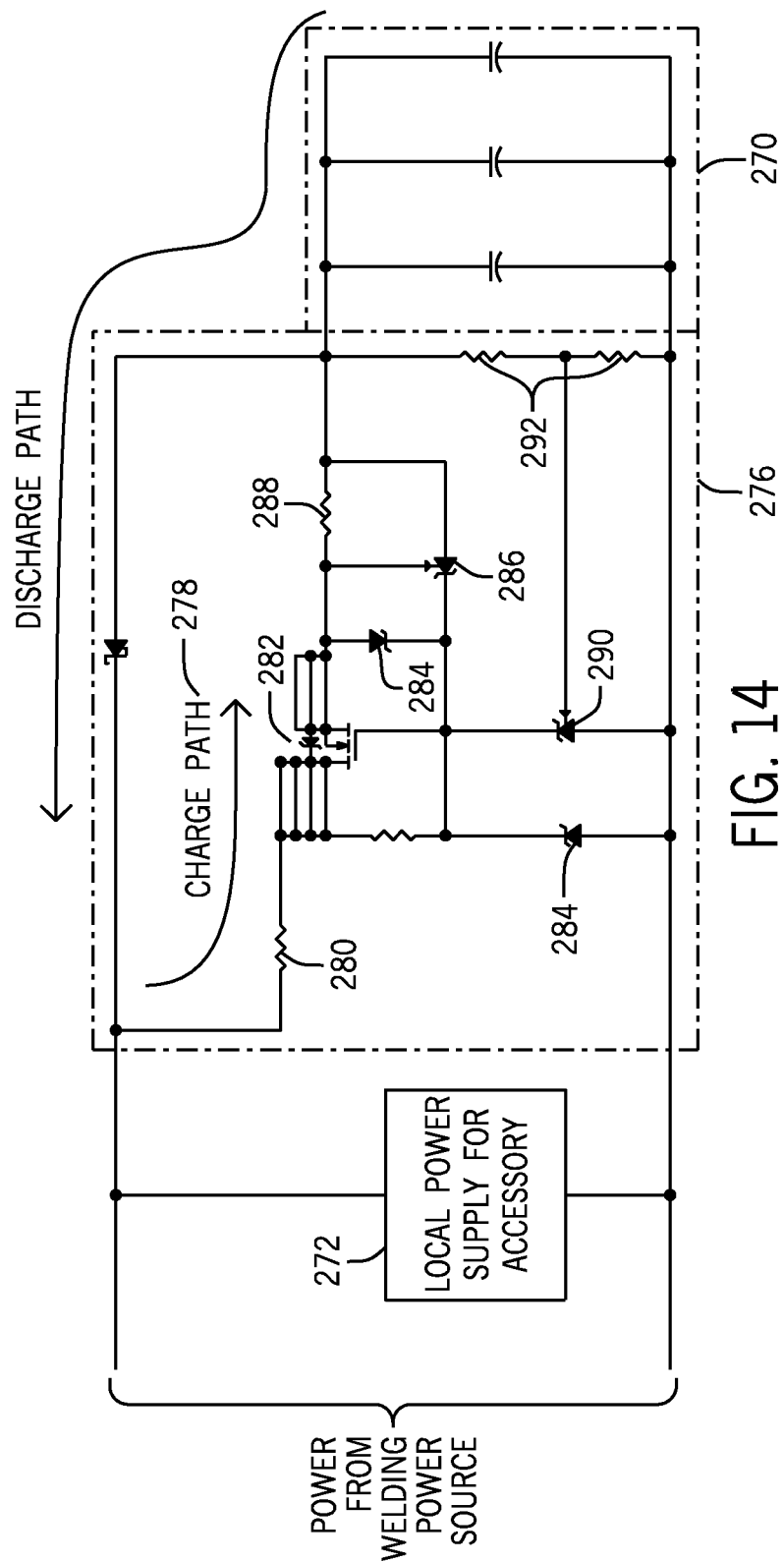
FIG. 14 is a somewhat more detailed diagram of an exemplary circuit for controlling inrush current to a welding pendant.

FIG. 14 illustrates an exemplary charge/discharge control circuit 276 such as may be suitable for a limiting inrush current to a remote component, such as a welding pendant. The energy storage device 270 is here illustrated as a series of capacitors. A charge path 278 is defined through a resistor 280 and a switch 282. In the illustrated embodiment, the resistor 280 is a relatively low resistance, such as 100 Ohms, although any suitable resistance could be used, and the switch 282 includes a MOSFET, although any suitable switch may be used. The resistor 280 will initially limit the flow of current to the capacitors upon connection of the component to a live power source. Current to the capacitors is limited by resistor 280 and by switch 282 under control of a Zener diode 286 (or another device, such as a circuit that mimics aspects of a Zener diode and an error amplifier in combination). This current can be made low enough by selection of the individual electrical components to prevent arcing when the pendant is connected to a welding power source open current voltage. Diodes 284 are provided for protection purposes. A current-limiting effect is provided by diode 286 (or other device as mentioned above) and a resistor 288 that act together to limit current by modulating the conductive state of switch 282. In a current circuit design, for example, the current flow is not allowed to exceed approximately 0.5 Amps. That is, switch 282 allows for charging of the capacitors, and this switch is maintained in a conductive state, but is throttled back to a limited current by interaction of components 286 and 288.

Moreover, an additional diode 290 (which again may be a circuit that mimics aspects of a diode in combination with an error amplifier) and additional resistors 292 are provided that act together to limit voltage. That is, these components as coupled in the illustrated diagram act to reduce the bias of switch 282 to effectively limit the voltage of the device. Consequently, relatively low voltage capacitors may be utilized.

In operation, the circuitry effectively limits the inrush of current when the component is initially coupled to a live power source, in this case any spark being limited to approximately 0.5 Amps. The storage devices, in this case a series of capacitors, are then allowed to charge. Thereafter, "ride-through" capabilities are provided by the capacitors which feed the local power supply 272 during a loss of welding power through a diode. It should be noted that the circuitry illustrated in FIG. 14, and indeed that of FIG. 13 and FIG. 15 described below are intended to be in addition to any other circuitry provided in the remote component, whether a pendant or wire feeder. That is, those components may nevertheless include various sensing, processing, control, wire feed, and other circuitry of the types described above.

Figure 15:
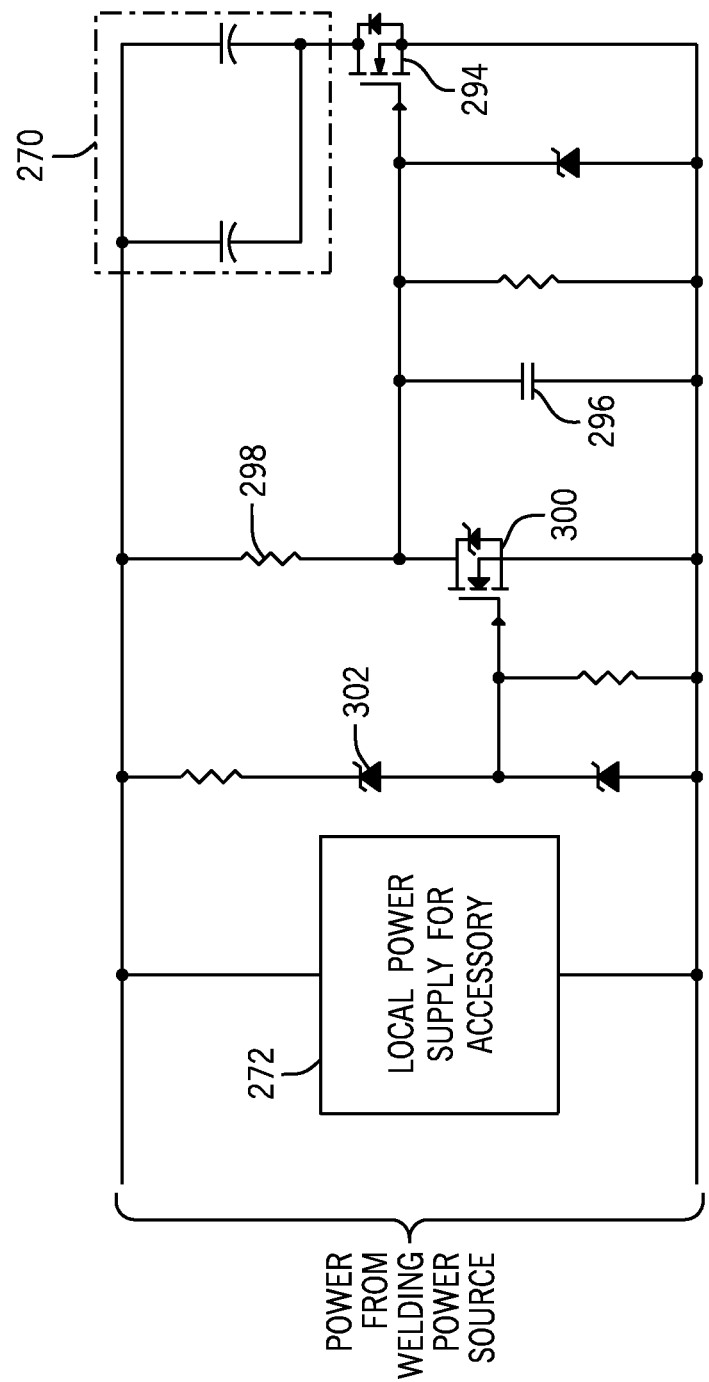
FIG. 15 is a similar detailed diagram of an exemplary circuit for controlling inrush current to a welding wire feeder.

FIG. 15 illustrates another exemplary circuit that may be used for current and/or power management in a remote device, in this case is particularly well-suited to a wire feeder of the type described above. The circuitry also includes a local power supply 272, as well as storage devices 270, in this case multiple capacitors. The application of current into the capacitors is delayed until a further capacitor 296 is charged through a resistor 298 to a gate threshold of a solid state switch 294. This delay, then, prevents or reduces the likelihood of arcing when the component is initially coupled to a live welding power source. Moreover, a voltage across the capacitors is effectively limited by interaction of a second solid state switch 300 and a diode 302. That is, when the diode 302 changes to a conductive state, the gate of switch 300 is powered, placing switch 294 in a non-conductive state. Current out of the capacitors passes through the internal diode of the package of switch 294.

Various enhancements to the circuitry of FIG. 15 may be easily envisaged, for example, a comparator could be provided between switch 294 and capacitor 296 to provide a "snap-on" operation in which the linear mode of switch 294 is effectively avoided. The circuitry thus provides a bi-directional, low impedance energy storage arrangement that effectively reduces or avoids arcing upon initial connection, while providing the desired local power supply capabilities and ride-through capabilities during operation.

FIG. 16 is an embodiment of the welding system 10 with a power supply 12 coupled to the device 310 via power cables 24. As discussed above, the device 310 may include, but is not limited to, the advanced process wire feeder 20 discussed above and illustrated in FIGS. 1-5. The power cables 24 couple the first and second terminals 26, 28 to the input terminals 40 of the device 310. For example, a first power cable 312 couples the first terminal 26 to the first connection 112, and a second power cable 314 couples the second terminal 28 to the second connection 114. Each of a first set 316, a second set 318, and a third set of power cables 24 may have different inductance values based at least in part on properties of the respective power cables 24. Properties that may affect the inductance of a power cable 24 may include, but is not limited to, length, material, disposition (e.g., coiled, straight) relative to the welding system 10, disposition relative to conductive materials, arrangement (e.g., parallel, twisted) relative to other power cables 24, and proximity to inductive sources (e.g., other power cables 24). For example, the first set 316 of power cables 24 that are coiled may have a greater inductance than the second set 318 of power cables 24 that are uncoiled. Furthermore, the third set 320 of power cables 24 may have a lesser inductance than the first and second sets 316, 318 of power cables 24 due to being uncoiled and having a relatively short length 322. As may be appreciated, various embodiments of the power cables 24 are not limited to the first, the second, and the third sets 316, 318, and 320 of power cables 24.

The power supply 12 provides power output to the device 310 along the set of the power cables 24. The device 310 and the power supply 12 may communicate via wireless connections or wired connections, such as the power cables 24. For example, the communications circuitry 70 of the device 310 may communicate with the communications circuitry 38 of the power supply 12. The device 310 may communicate power demands of a load 324 to the power supply 12, and the control circuitry 32 of the power supply 12 controls the power conversion circuitry 30 to change the power output to satisfy the requested power demand. For example, the device 310 may communicate changes to settings of the voltage (e.g., weld voltage) and/or the current to be supplied by the power supply 12 during operation of the device 310. During operation of the device 310 (e.g., during weld formation), the device 310 increases the power output demanded from the power supply 12 by the load 324. The load 324 may include, but is not limited to, power conversion circuitry (e.g., boost converter, bus capacitor, buck converter), motor, pump, light, power tool, or any combination thereof. For example, upon user actuation of a trigger of a welding torch coupled to the device 310, the device 310 increases the power output demanded from the power supply 12, thereby increasing the voltage and/or the current along the power cables 24. Upon release of the trigger, the device 310 decreases the power output demanded from the power supply 12, thereby decreasing the voltage and/or the current along the power cables 24. In some embodiments, the device 310 and the power supply 12 may communicate during idle operation of the welding system 10 and/or while the device 310 is providing power output (e.g., welding output) to the load 324. For example, the device 310 may communicate with the power supply 12 during weld formation by a torch coupled to the device 310.

During idle operation of the welding system 10, such as at start up of the welding system 10 or between welding operations, the device 310 may determine the inductance of the power cables. In some embodiments, the communications circuitry 70 of the device 310 may be paired (e.g., synchronized) with the communications circuitry 38 of the power supply 12. When paired, the communications circuitry 70 and/or the communications circuitry 38 may verify that the power cables 24 couple the device 310 and the power supply 12. To verify the maintained coupling via the power cables, the device 310 may periodically change the current demanded from the power supply 12, and the power supply 12 may respond in a prescribed manner. For example, during idle operation, the device 310 may briefly change the current demand by a prescribed amount (e.g., 1, 2, 3, 4, 5, 6, 7, 8 9, 10 Amperes) at intervals of approximately 1, 2, 3, 4, 5, 6, 7, 8, 9, 10 or more seconds. In an embodiment where the device 310 is an advanced process wire feeder 20, the device may briefly change the current demand by turning on the boost converter. The current provided by the power supply 12 changes based at least in part on the changed current demand, and the device 310 verifies the maintenance of the connection by monitoring the power input received via the power cables 24 during a verification interval (e.g., approximately 10 seconds).

The sensing circuitry 116 of the device senses the current and/or voltage of the power output received by the device 310. As described herein, the sensing circuitry 116 monitors characteristics of the power output provided to the device 310 in response to the changed current demand from the device 310, thereby enabling the sensing circuitry 116 to determine the inductance of the power cables 24 carrying the power output from the power supply 12. For example, a delay for the sensed voltage rise to a threshold voltage after the sensed current demand begins to increase corresponds to an inductance value. The sensing circuitry 116 compares the determined inductance to threshold inductance values stored in a memory. In some embodiments, an operator interface 326 may provide a notification (e.g., display, sound, light) indicating that the determined inductance of the power cables 24 is greater than the threshold inductance. Additionally, or in the alternative, the sensing circuitry 116 may disable operation of the device 310 until the determined inductance is less than the threshold inductance. That is, the device 310 may disable operation of the load 624 and/or the device 310 may stop transmission of power output through the weld cable 62 or the work cable 64 coupled to the device 310 when the determined inductance is greater than the threshold inductance.

FIG. 17 illustrates a chart of an input voltage ($V_{bus}$) and input current ($I_{load}$) versus time, where $V_{bus}$ and $I_{load}$ are provided over power cables to the device 310 from a power supply 12. While the embodiments discussed herein with FIG. 17 may include the advanced process wire feeder 20 as the device 310 where the load 326 is the power conversion circuitry 58 (e.g., boost converter 104, bus capacitor 110, buck converter 106), the inductance of power cables 24 may be determined by sensing circuitry 116 of any coupled device 310. During idle operation of the device 310, the $V_{bus}$ and $I_{load}$ may remain substantially constant at $V_1$ and $I_1$ respectively. At $T_1$, the boost converter of the load increases the current demand from the power supply from $I_1$ to $I_2$. The input current $I_{load}$ received from the power supply begins to increase at $T_1$, and increases at a ramp rate 350 towards $I_2$. The inductance of the power cables causes the change in $V_{bus}$ to lag behind $I_{load}$ for a voltage transient duration 352, as shown by the flat portion of $V_{bus}$ of FIG. 17. After the voltage transient 352, $V_{bus}$ begins to increase, reaching a threshold voltage ($V_{threshold}$) at $T_2$. The threshold voltage may be stored in a memory of the device 310, and may be any value between $V_1$ and $V_2$. For example, $V_{threshold}$ may be approximately 5, 10, 15, 20, 25, 30, 40, or 50 percent greater than $V_1$.

The sensing circuitry of the device 310 may determine the inductance of the power cables via monitoring the response of $V_{bus}$ and/or $I_{load}$. That is, the sensing circuitry may determine the inductance of the power cables via monitoring the time delay between $T_2$ and $T_1$ when $V_{bus}$ is approximately equal to $V_{threshold}$, the ramp rate of $I_{load}$, the time delay between $T_1$ and $T_3$ when $I_{load}$ is approximately equal to $I_2$, or a relative comparison of the $V_{bus}$ to $I_{load}$, or any combination thereof. The delay between $T_1$ and $T_2$ is based at least in part on the inductance of the power cables that transmit the power output from the power supply to the device 310. For example, increasing the inductance of the power cables may increase the delay, and decreasing the inductance of the power cables may decrease the delay. The ramp rate 350 of $I_{load}$ may be based at least in part on the inductance of the power cables that transmit the power output from the power supply to the device. For example, increasing the inductance of the power cables may decrease the ramp rate 350, and decreasing the inductance of the power cables may increase the ramp rate 350. Additionally, or in the alternative, the sensing circuitry may determine the inductance of the power cables based at least on a measure of the received voltage at a time when the received current is approximately 50% between $I_1$ and $I_2$. Furthermore, the delay between $T_1$ and $T_3$ may be proportional to the inductance of the power cables.

FIG. 18 is a flow chart of an embodiment of a method 398 for determining the inductance of power cables between a power supply and a device of the welding system. The device may signal (block 400) the power supply at a time $T_0$ that the current demand will change at $T_1$. Accordingly, the device coordinates with the power supply to change (block 402) the power output supplied from the power supply at $T_1$. Sensing circuitry of the device monitors (block 404) the current and the voltage of the power output received by the device. For example, the sensing circuitry may measure (block 406) the voltage delay when the received voltage reaches $V_{threshold}$ (e.g., $T_2$-$T_1$). In some embodiments, the sensing circuitry may measure (block 408) $V_{bus}$ relative to and $I_{load}$. In some embodiments, the sensing circuitry may measure (block 410) a ramp rate of the received current. Additionally, or in the alternative, the sensing circuitry may measure (block 412) the current delay when the received current reaches the demand current (e.g., $T_3$-$T_1$).

Based at least in part on measurements of the sensing circuitry while monitoring (block 404) the received voltage and current, the sensing circuitry determines (block 414) the inductance ($L_{cable}$) of the power cables. The sensing circuitry may determine the inductance of the power cables based at least in part on comparison of the measured values of blocks 406-412 with values stored in a memory. For example, the sensing circuitry may utilize a look up table, an algorithm, or a model stored in a memory to determine the inductance of the power cables. At node 416, the sensing circuitry determines whether $L_{cable}$ is greater than a threshold inductance ($L_{threshold}$). The threshold inductance may be a value input by the user and/or a value stored in a memory. In some embodiments, the threshold inductance is based at least in part on the storage capacity of the power storage circuitry of the device, or a desired quality of the power output from the device, or any combination thereof. For example, the device may be configured to reduce or eliminate the effects of the inductance when $L_{cable}$ is less than $L_{threshold}$. If the $L_{cable}$ is greater than $L_{threshold}$, the device may signal (block 418) the operator (e.g., via a display, sound, light) that the determined inductance of the power cables 24 is greater than the threshold inductance. In response to the signal from the device, the user may change the power cables and/or adjust the arrangement of the power cables to attempt to reduce the inductance. While $L_{cable}$ is greater than $L_{threshold}$, the sensing circuitry disables (block 420) the operation of the device.

If $L_{cable}$ is less than $L_{threshold}$, the sensing circuitry may reset (block 422) a pairing counter, thereby enabling the device to remain in an idle operation mode until the power output (e.g., weld output) is demanded from the device. The sensing circuitry waits (block 424) for the sample interval before repeating method 398 to determine the inductance of the power cables and to verify whether the device remains coupled to the power supply via the power cables. At node 426, the sensing circuitry enables operation of the device if it was previously disabled at block 420. For example, where the sensing circuitry disabled (block 420) operation of the device due to the value of $L_{cable}$, the sensing circuitry may enable (block 428) operation of the device in a subsequent iteration of the method 398 after the user has adjusted or replaced the power cables to reduce $L_{cable}$.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
   a welding-related device coupled to a power supply and to receive current from the power supply via power cables;
   control circuitry to communicate to the power supply a demand for an increase in power from the power supply; and
   a sensing circuit to:
      monitor an initial current or voltage level at the welding-related device when the communication is sent;
      determine when the current or voltage level at the welding-related device has increased from the initial current or voltage by a threshold level; and
      measure a time delay representing a duration of time between the communication and when the current or voltage at the welding-related device increased from the initial current or voltage to the threshold level, wherein the current flows through the power cables.

2. The welding system of claim 1, wherein the welding-related device comprises a wire feeder.

3. The welding system of claim 1, wherein the sensing circuit monitors the time delay based at least in part on a voltage delay in a voltage of the received power increasing by a threshold voltage after a change in the current.

4. The welding system of claim 1, wherein the sensing circuit monitors the time delay based at least in part on a ramp rate of the current.

5. The welding system of claim 1, wherein the sensing circuit monitors the time delay based at least in part on a comparison of the monitored voltage to the monitored current after a change in the current.

6. The welding system of claim 1, wherein the sensing circuit monitors the time delay based at least in part on a current delay in the current changing to a demand current.

7. The welding system of claim 1, wherein the welding-related device comprises a plasma cutter.

8. The welding system of claim 1, wherein the welding-related device comprises an induction heater.

9. The welding system of claim 1, wherein the welding-related device comprises a power generator.

10. The welding system of claim 1, wherein the sensing circuit determines an inductance of the power cables based on the time delay.

11. The welding system of claim 10, wherein the welding-related device provides a signal when the inductance is greater than a threshold inductance.

12. The welding system of claim 10, wherein the welding-related device disables operation of the welding-related device when the inductance is greater than a threshold inductance, and the welding-related device is configured to enable operation of the welding-related device when the inductance is less than the threshold inductance.

13. A welding wire feeder comprising:
input terminals configured to receive power from a power supply through power cables connected to the input terminals;
control circuitry to communicate to the power supply a demand for an increase in power from the power supply; and
a sensing circuit to monitor at least one of current or voltage between the demand for the increase and when the voltage at the welding wire feeder reaches a threshold level, the sensing circuit to measure a voltage time delay representing a duration of time between the communication and when the voltage reaches the threshold level, wherein the current flows through the power cables, the time delay is caused by inductance of the power cables;
wherein the control circuitry further comprises a processor operatively coupled to a memory to store values associated with the threshold level, the processor to adjust operation of the welding wire feeder based at least in part on the time delay.

14. The welding wire feeder of claim 13, wherein the sensing circuit monitors the time delay based at least in part on a voltage delay in a voltage changing to a threshold voltage after a change in the current.

15. The welding wire feeder of claim 13, wherein the sensing circuit monitors the time delay based at least in part on a ramp rate of the current.

16. The welding wire feeder of claim 13, wherein the sensing circuit monitors the time delay based at least in part on a comparison of a voltage to the current of after a change in the current.

17. The welding wire feeder of claim 13, wherein the sensing circuit monitors the time delay based at least in part on a current delay in the current changing to a demand current.

18. The welding wire feeder of claim 13, wherein the sensing circuit determines an inductance of the power cables based on the time delay.

19. The welding wire feeder of claim 18, wherein the control circuitry is configured to disable operation of the welding wire feeder when the inductance is greater than a threshold inductance, and the control circuitry is configured to enable operation of the welding wire feeder when the inductance is less than the threshold inductance.

20. A method for determining an inductance of power cables comprising:
communicating, via control circuitry of a welding-related device, a demand for an increase in power from a power supply, wherein the welding-related device is coupled to the power supply to receive current from the power supply via power cables;
monitoring, via a sensing circuit, an initial current or voltage level at the welding-related device when the demand for an increase in power was communicated;
determining, via the sensing circuit, when one the current or voltage level at the welding-related device has increased from the initial current or voltage by a threshold current or voltage level; and
measuring, via the sensing circuit, a time delay representing a duration of time between when the demand for an increase in power was communicated and when the current or voltage at the welding-related device increased from the initial current or voltage by the threshold current or voltage level, wherein the current flows through the power cables.

* * * * *